US012705860B2

(12) United States Patent
Zhong

(10) Patent No.: US 12,705,860 B2

(45) Date of Patent: Aug. 11, 2026

(54) COMPUTER-IMPLEMENTED OBJECT DETECTION METHOD USING ORIENTED BOUNDING BOXES, OBJECT DETECTION APPARATUS, AND COMPUTER-READABLE MEDIUM

(71) Applicant: BOE Technology Group Co., Ltd., Beijing (CN)

(72) Inventor: Pan Zhong, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 321 days.

(21) Appl. No.: 18/563,904

(22) PCT Filed: Nov. 1, 2022

(86) PCT No.: PCT/CN2022/128880

§ 371 (c)(1),
(2) Date: Nov. 23, 2023

(87) PCT Pub. No.: WO2024/092484

PCT Pub. Date: May 10, 2024

(65) Prior Publication Data

US 2025/0078450 A1 Mar. 6, 2025

(51) Int. Cl.

*G06V 10/82* (2022.01)
*G06T 7/194* (2017.01)

(Continued)

(52) U.S. Cl.

CPC ............ *G06V 10/751* (2022.01); *G06T 7/194* (2017.01); *G06T 7/75* (2017.01); *G06V 10/255* (2022.01);

(Continued)

(58) Field of Classification Search

CPC ............... G06V 10/751; G06V 10/255; G06V 10/7747; G06V 10/82; G06V 2201/07; G06V 10/25; G06T 7/194; G06T 7/75

See application file for complete search history.

(56) References Cited

U.S. PATENT DOCUMENTS

| | | | | |
|---|---|---|---|---|
| 12,002,252 | B2 * | 6/2024 | Wu | G06T 3/40 |
| 2021/0001885 | A1 | 1/2021 | Zhang et al. | |

(Continued)

FOREIGN PATENT DOCUMENTS

| | | | |
|---|---|---|---|
| CN | 109977944 | A | 7/2019 |
| CN | 110765866 | A | 2/2020 |

(Continued)

OTHER PUBLICATIONS

Zhang, Yu, et al. "Real-time vehicle detection based on improved yolo v5." Sustainability 14.19 (2022): 12274. (Year: 2022).*

(Continued)

*Primary Examiner* — Henok Shiferaw
*Assistant Examiner* — Urooj Fatima
(74) *Attorney, Agent, or Firm* — Intellectual Valley Law, P.C.

(57) ABSTRACT

A computer-implemented object detection method includes determining a first bounding box for an object to be detected in an image; determining whether the first bounding box of the object to be detected in the image is oriented either horizontally or vertically with respect to a horizontal axis of the image; upon determination that the first bounding box of the object to be detected in the image is not oriented either horizontally or vertically, rotating the first bounding box to obtain a second bounding box, which is oriented either horizontally or vertically with respect to the horizontal axis of the image; extracting features from a portion of the image in the second bounding box; comparing the features (Continued)

extracted from the portion of the image in the second bounding box with template features of a candidate object; and outputting a position of the object to be detected and feature recognition results.

18 Claims, 13 Drawing Sheets

(51) Int. Cl.

| | |
|---|---|
| ***G06T 7/73*** | (2017.01) |
| ***G06V 10/20*** | (2022.01) |
| ***G06V 10/75*** | (2022.01) |
| ***G06V 10/774*** | (2022.01) |

(52) U.S. Cl.
CPC .......... *G06V 10/7747* (2022.01); *G06V 10/82* (2022.01); *G06V 2201/07* (2022.01)

(56) References Cited

U.S. PATENT DOCUMENTS

| | | | | |
|---|---|---|---|---|
| 2021/0056708 | A1* | 2/2021 | Li | G06N 3/045 |
| 2021/0166477 | A1* | 6/2021 | Bunkasem | G06V 10/774 |

FOREIGN PATENT DOCUMENTS

| | | | | | |
|---|---|---|---|---|---|
| CN | 110837835 | A | * | 2/2020 | G06F 18/214 |
| CN | 111832388 | A | | 10/2020 | |
| CN | 111862097 | A | | 10/2020 | |
| CN | 113191296 | A | | 7/2021 | |
| CN | 113326734 | A | | 8/2021 | |
| CN | 113591810 | A | | 11/2021 | |
| CN | 113869211 | A | | 12/2021 | |
| CN | 114266884 | A | | 4/2022 | |
| KR | 20200123323 | A | | 10/2020 | |
| WO | WO-2022142890 | A1 | * | 7/2022 | G06T 17/00 |

OTHER PUBLICATIONS

Li, Rui, and Yanpeng Wu. “Improved YOLO v5 wheat ear detection algorithm based on attention mechanism.” Electronics 11.11 (2022): 1673. (Year: 2022).*

Zaghari, Nayereh, et al. “Improving the learning of self-driving vehicles based on real driving behavior using deep neural network techniques: N. Zaghari et al.” The Journal of Supercomputing 77.4 (2021): 3752-3794. (Year: 2021).*

Yang, Hongbo, et al. “Research on underwater object recognition based on YOLOv3.” Microsystem Technologies 27.4 (2021): 1837-1844. (Year: 2021).*

International Search Report & Written Opinion mailed Jun. 9, 2023, regarding PCT/CN2022/128880.

Yang et al., “The KFIoU Loss for Rotated Object Detection”, arXiv:2201.12558v3 [cs.CV] May 30, 2022.

Zhou et al., “MMRotate: A Rotated Object Detection Benchmark using PyTorch”, arXiv:2204.13317v4 [cs.CV] Jul. 19, 2022.

Cao et al., “Fine-grained remote sensing target detection with oriented bounding box based on improved Yolov5”, Beijing Institute of Space Mechanics and Electricity, Proc. SPIE 12169, Eighth Symposium on Novel Photoelectronic Detection Technology and Applications, 12169B2 (Mar. 27, 2022); doi: 10.1117/12.2626436.

Feng et al., “Vehicle Target Detection in Yolov5 Remote Sensing Image Based on Rotating Box Regression”, Proceedings of the 15th National Conference on Signal and Intelligent Information Processing and Applications; English Translation of Abstract attached.

* cited by examiner determining a first bounding box for an object to be detected in an image, wherein the first bounding box and the object to be detected have a substantially the same orientation determining whether the first bounding box of the object to be detected in the image is oriented either horizontally or vertically with respect to a horizontal axis of the image upon determination that the first bounding box of the object to be detected in the image is not oriented either horizontally or vertically with respect to the horizontal axis of the image, rotating the first bounding box to obtain a second bounding box, in which the second bounding box is oriented either horizontally or vertically with respect to the horizontal axis of the image extracting features from a portion of the image in the second bounding box comparing the features extracted from the portion of the image in the second bounding box with template features of a candidate object upon determination the features extracted from the second bounding box are similar to the template features of the candidate object, outputting a position of the object to be detected and feature recognition results

FIG. 1

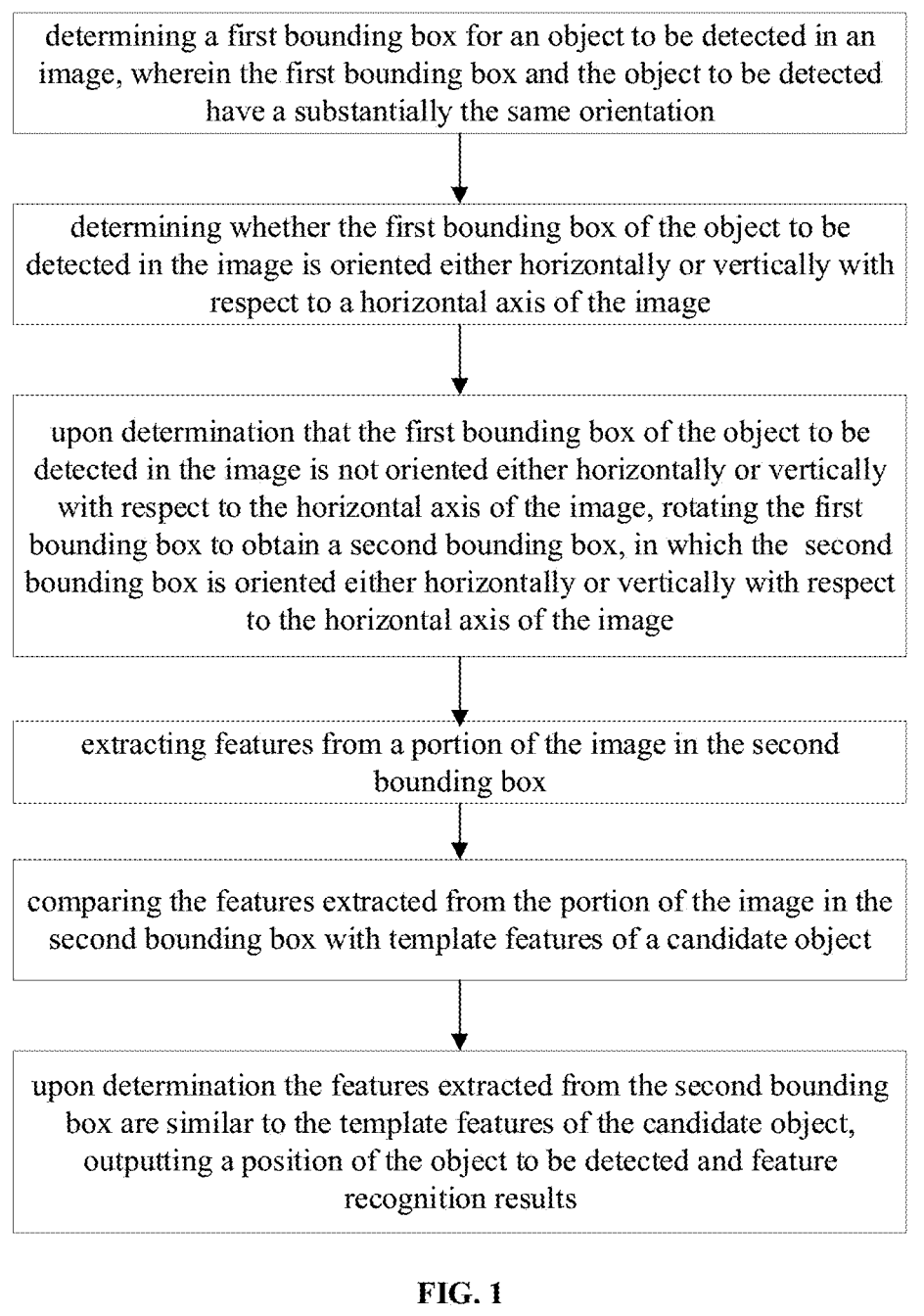

COMPUTER-IMPLEMENTED OBJECT DETECTION METHOD USING ORIENTED BOUNDING BOXES, OBJECT DETECTION APPARATUS, AND COMPUTER-READABLE MEDIUM

CROSS-REFERENCE TO RELATED APPLICATION

This application is a national stage application under 35 U.S.C. § 371 of International Application No. PCT/CN2022/128880, filed Nov. 1, 2022, the contents of which are incorporated by reference in the entirety.

TECHNICAL FIELD

The present invention relates to display technology, more particularly, to a computer-implemented object detection method, a computer-implemented object detection apparatus, and a computer-readable medium.

BACKGROUND

Object detection has been developed in various application scenarios such as retail automation, automatic driving, unmanned aerial vehicles, and fabrication automation. Various algorithms have been implemented in object detection, including one-stage algorithm and two-stage algorithm. Two-stage algorithms include RCNN, Fast RCNN, and Faster-RCNN. In a two-stage algorithm, a region potentially containing a target object is first selected among a large number of candidate regions, followed by object detection in the candidate region. Object detection implemented with the two-stage algorithm has a relatively high accuracy, but the detection speed is low. One-stage algorithms, on the other hand, enables high-speed detection.

SUMMARY

In one aspect, the present disclosure provides a computer-implemented object detection method, comprising determining a first bounding box for an object to be detected in an image, wherein the first bounding box and the object to be detected have a substantially the same orientation; determining whether the first bounding box of the object to be detected in the image is oriented either horizontally or vertically with respect to a horizontal axis of the image; upon determination that the first bounding box of the object to be detected in the image is not oriented either horizontally or vertically with respect to the horizontal axis of the image, rotating the first bounding box to obtain a second bounding box, which is oriented either horizontally or vertically with respect to the horizontal axis of the image; extracting features from a portion of the image in the second bounding box; comparing the features extracted from the portion of the image in second bounding box with template features of a candidate object; and upon determination the features extracted from the second bounding box are similar to the template features of the candidate object, outputting a position of the object to be detected and feature recognition results.

Optionally, the first bounding box is represented by ($b_x$, $b_y$, $b_w$, $b_h$, $b_{theta}$); wherein $b_x$ and $b_y$ stand for coordinates of the first bounding box; $b_w$ and $b_h$ stand for lengths of a long side and a short side of the first bounding box; and $b_{theta}$ stands for an angle of an orientation of the first bounding box with respect to the horizontal axis of the image.

Optionally, $b_x=2\sigma(t_x)-0.5+Cx$; $b_y=2\sigma(t_y)-0.5+Cy$; $b_w=p_w(2\sigma(t_w))^2$; $b_h=p_h(2\sigma(t_h))^2$ $b_{theta}=(\sigma(t_{theta})-0.5)*\pi$; wherein $t_x$, $t_y$, $t_w$, $t_h$, $t_{theta}$ stand for a central coordinate of an anchor box output from a neural network, a box width of the anchor box, a box height of the anchor box, and an angle of an orientation of the anchor box with respect to a horizontal axis of the image; σ stands for Sigmoid activation function used to map network prediction values; $t_x$, $t_y$, $t_w$, $t_h$ are between [0,1]; Cx, Cy are offsets in a cell grid relative to a top left corner of the image; $p_w$, $p_h$ are the a priori box width and height; $b_x$, $b_y$ stand for center coordinates of the second bounding box; $b_w$, $b_h$ stand for width and height of the second bounding box; and $b_{theta}$ stands for an angle of an orientation of the second bounding box with respect to the horizontal axis of the image.

Optionally, determining the first bounding box is performed by a neural network; wherein the neural network comprises an output layer configured to output anchor boxes predicting bounding boxes; and a respective anchor box includes a channel representing a value of an angle of an orientation of the first bounding box with respect to the horizontal axis of the image.

Optionally, the neural network uses a loss function expressed as $L_{total}=L_{obj}+L_{reg}=L_{obj}+L_c+L_{kf}$; wherein $L_{total}$ stands for total loss; $L_{obj}$ stands for confidence loss; Le stands for distance loss at a centroid; $L_{reg}=L_c+L_{kf}$; $L_{kf}=1-$KFIoU; and KFIoU is an approximation of skew intersection over union.

Optionally, the computer-implemented object detection method further comprises obtaining real data of an object to be detected; generating simulation generated training data through a simulation method based on the real data; combining the real data and the simulation generated training data; and training a detection model using a combination of the real data and the simulation generated training data, wherein the detection model is used for determining the first bounding box for an object to be detected in an image.

Optionally, generating the simulation generated training data comprises extracting object image from the real data; performing foreground segmentation on the object image; obtaining a single foreground image; and pasting multiple single foreground images on a background image, thereby generating the training data.

Optionally, the computer-implemented object detection method further comprises one or more of randomly pasting a hand image on the single foreground image; performing a random rotation on the single foreground image; and performing random scaling on the single foreground image; thereby obtaining a processed single foreground image.

Optionally, generating the simulation generated training data comprises randomly generating coordinates of a point of pasting a processed single foreground image on the background image; and determining whether ratio values of intersection over union (IoU) between the processed single foreground image pasted on the point of pasting and one or more previously pasted foreground images are less than a first threshold IoU value.

Optionally, the computer-implemented object detection method further comprises updating template features of candidate objects with template features of one or more new candidate objects; wherein the detection model and a recognition model for feature extraction are not re-trained upon addition of the one or more new candidate objects.

Optionally, generating the simulation generated training data further comprises upon determination that the ratio values of IoU between the processed single foreground image pasted on the point of pasting and all previously pasted foreground images are less than the first threshold IoU value, determining whether a ratio value of IoU between the processed single foreground image pasted on the point of pasting and any of the previously pasted foreground images is greater than a second threshold IoU value.

Optionally, generating the simulation generated training data further comprises upon determination that the ratio values of IoU between the processed single foreground image pasted on the point of pasting and a respective previously pasted foreground image of the previously pasted foreground images are greater than a second threshold IoU value, subtracting an intersection area from a mask of the respective previously pasted foreground image, the intersection area being an area where the processed single foreground image pasted on the point of pasting intersects with the mask; and updating parameters of a respective bounding box of the respective previously pasted foreground image, thereby obtaining updated parameters of an updated bounding box of the respective previously pasted foreground image.

Optionally, generating the simulation generated training data further comprises upon determination that none of the ratio values of IoU between the processed single foreground image pasted on the point of pasting and all previously pasted foreground images is less than the first threshold IoU value, determining whether a total number of times of generating coordinates of point of pasting is less than a threshold value.

Optionally, generating the simulation generated training data further comprises upon determination that the total number of times of generating coordinates of point of pasting is less than the threshold value, and none of the ratio values of IoU between the processed single foreground image pasted on the point of pasting and all previously pasted foreground images is less than the first threshold IoU value, repeating the step of randomly generating coordinates of point of pasting the processed single foreground image.

Optionally, generating the simulation generated training data comprises pasting a respective processed single foreground image of all processed single foreground images on a background image in a sparse pasting manner, wherein ratio values of IoU between the respective processed single foreground image and all previously pasted foreground images are less than a third threshold IoU value.

Optionally, generating the simulation generated training data comprises pasting a respective processed single foreground image of all processed single foreground images on a background image in a dense pasting manner, wherein ratio values of IoU between the respective processed single foreground image and all previously pasted foreground images are greater than a fourth threshold IoU value and less than a fifth threshold IoU value.

Optionally, generating the simulation generated training data comprises combining multiple objects as a unit, in which the multiple objects are arranged in a certain format; and pasting a respective unit of all units on a background image in a sparse pasting manner, wherein ratio values of IoU between the respective unit pasted and all previously pasted units are less than a sixth threshold IoU value.

Optionally, comparing the features extracted from the second bounding box with template features of a candidate object comprises calculating cosine similarity between the features extracted from the second bounding box with the template features of the candidate object; and upon determination a value of the cosine similarity is greater than a threshold similarity value, outputting the position of the object to be detected and the feature recognition results.

In some embodiments, the computer-implemented object detection method further includes updating template features of candidate objects with template features of one or more new candidate objects; wherein the detection model and a recognition model for feature extraction are not re-trained upon addition of the one or more new candidate objects. The present disclosure obviates the need of re-training the object detection model and/or the recognition model when a new object category is added or when the packaging for a same object changes, significantly enhancing reusability of model parameters. The present computer-implemented object detection method is much robust, and extremely easy to update and maintain.

In another aspect, the present disclosure provides an object detection apparatus, comprising a memory; one or more processors; wherein the memory and the one or more processors are connected with each other; and the memory stores computer-executable instructions for controlling the one or more processors to determine a first bounding box for an object to be detected in an image, wherein the first bounding box and the object to be detected have a substantially the same orientation; determine whether the first bounding box of the object to be detected in the image is oriented either horizontally or vertically with respect to a horizontal axis of the image; upon determination that the first bounding box of the object to be detected in the image is not oriented either horizontally or vertically with respect to the horizontal axis of the image, rotate the first bounding box to obtain a second bounding box, which is oriented either horizontally or vertically with respect to the horizontal axis of the image; extract features from a portion of the image in the second bounding box; compare the features extracted from the portion of the image in second bounding box with template features of a candidate object; and upon determination the features extracted from the second bounding box are similar to the template features of the candidate object, output a position of the object to be detected and feature recognition results.

In another aspect, the present disclosure provides a computer-readable medium having computer-readable instructions thereon, the computer-readable instructions being executable by a processor to cause the processor to perform determining a first bounding box for an object to be detected in an image, wherein the first bounding box and the object to be detected have a substantially the same orientation; determining whether the first bounding box of the object to be detected in the image is oriented either horizontally or vertically with respect to a horizontal axis of the image; upon determination that the first bounding box of the object to be detected in the image is not oriented either horizontally or vertically with respect to the horizontal axis of the image, rotating the first bounding box to obtain a second bounding box, which is oriented either horizontally or vertically with respect to the horizontal axis of the image; extracting features from a portion of the image in the second bounding box; comparing the features extracted from the portion of the image in second bounding box with template features of a candidate object; and upon determination the features extracted from the second bounding box are similar to the template features of the candidate object, outputting a position of the object to be detected and feature recognition results.

BRIEF DESCRIPTION OF THE FIGURES

The following drawings are merely examples for illustrative purposes according to various disclosed embodiments and are not intended to limit the scope of the present invention.

FIG. 1 is a flow chart illustrating a process of rotated object detection in some embodiments according to the present disclosure.

DETAILED DESCRIPTION

Figure 2A:
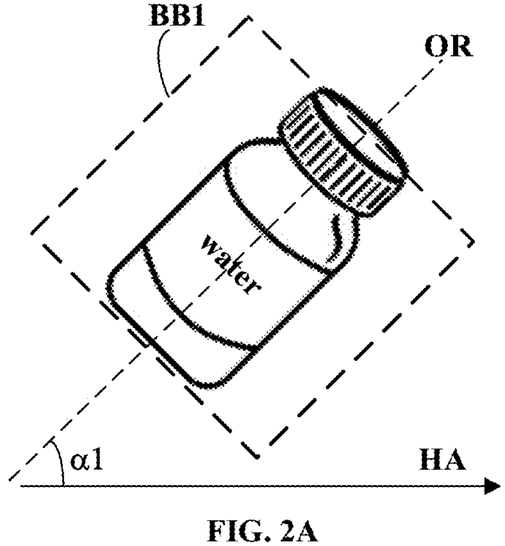
FIG. 2A illustrates a first bounding box for an object to be detected in an image in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a computer-implemented object detection method, an object detection apparatus, and a computer-readable medium that substantially obviate one or more of the problems due to limitations and disadvantages of the related art. In one aspect, the present disclosure provides a computer-implemented object detection method. In some embodiments, the method includes determining a first bounding box for an object to be detected in an image, wherein the first bounding box and the object to be detected have a substantially the same orientation; determining whether the first bounding box of the object to be detected in the image is oriented either horizontally or vertically with respect to a horizontal axis of the image; upon determination that the first bounding box of the object to be detected in the image is not oriented either horizontally or vertically with respect to a horizontal axis of the image, rotating the first bounding box to obtain a second bounding box, in which the second bounding box is oriented either horizontally or vertically with respect to the horizontal axis of the image; extracting features from a portion of the image in the second bounding box; comparing the features extracted from the portion of the image in the second bounding box with template features of a candidate object; and upon determination the features extracted from the second bounding box are similar to the template features of the candidate object, outputting a position of the object to be detecte4d and feature recognition results.

FIG. 1 is a flow chart illustrating a process of rotated object detection in some embodiments according to the present disclosure. Referring to FIG. 1, the method in some embodiments includes determining a first bounding box for an object to be detected in an image, wherein the first bounding box and the object to be detected have a substantially the same orientation; determining whether the first bounding box of the object to be detected in the image is oriented either horizontally or vertically with respect to a horizontal axis of the image; upon determination that the first bounding box of the object to be detected in the image is not oriented either horizontally or vertically with respect to a horizontal axis of the image, rotating the first bounding box to obtain a second bounding box, in which the second bounding box is oriented either horizontally or vertically with respect to the horizontal axis of the image; extracting features from a portion of the image in the second bounding box; comparing the features extracted from the portion of the image in the second bounding box with template features of a candidate object; upon determination the features extracted from the second bounding box are similar to the template features of the candidate object, outputting a position of the object to be detected and feature recognition results.

FIG. 2A illustrates a first bounding box for an object to be detected in an image in some embodiments according to the present disclosure. Referring to FIG. 2A, the horizontal axis of the image is denoted as HA, the object may be a retail product being picked up by a customer. The first bounding box BB1 and the object to be detected have a substantially the same orientation. As used herein, the term "substantially the same orientation" encompasses deviations of up to 0.5 degree, 1 degree, 2 degrees, or 5 degrees, from a reference orientation. In the context of the present disclosure, the first bounding box BB1 in some embodiments refers to a non-horizontally oriented bounding box.

Figure 2B:
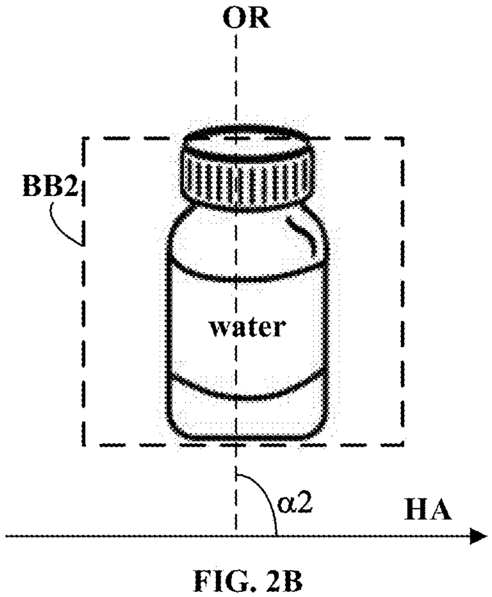
FIG. 2B illustrates a second bounding box for an object to be detected in an image in some embodiments according to the present disclosure.

Referring to FIG. 2A, in some embodiments, the object to be detected may be arbitrarily oriented with respect to the horizontal axis HA of the image. As used herein, the orientation OR of the object to be detected refers to an orientation from a typically considered lower side to a typically considered upper side of the object to be detected, or from a typically considered upper side to a typically considered lower side of the object to be detected. For example, a water bottle typically has a bottom side and a top side, the orientation of the water bottle is from the bottom side of the water bottle where it typically sits on a surface to a top side of the water bottle where a cap is situated. In an application scenario of retail product, the orientation OR of the object to be detected is typically the same as an orientation of texts on the retail product. For example, the orientation OR of the water bottle in FIG. 2A and FIG. 2B is perpendicular to that of the text "water" on the water bottle. The first bounding box BB1 and the object to be detected have a substantially the same orientation, e.g., the orientation OR. The first bounding box BB1 is oriented neither horizontally nor vertically with respect to the horizontal axis HA of the image. For example, a long side or a short side of the first bounding box BB1 is not parallel to the horizontal axis HA of the image.

Referring to FIG. 2A, the orientation OR of the first bounding box BB1 or the object to be detected is at an angle of al with respect to the horizontal axis HA of the image, wherein $\alpha 1$ is an angle that is not zero or 90 degrees. For example, al is in a range of 5 degrees to 85 degrees, e.g., 5 degrees to 10 degrees, 10 degrees to 15 degrees, 15 degrees to 20 degrees, 20 degrees to 25 degrees, 25 degrees to 30 degrees, 30 degrees to 35 degrees, 35 degrees to 40 degrees, 40 degrees to 45 degrees, 45 degrees to 50 degrees, 50 degrees to 55 degrees, 55 degrees to 60 degrees, 60 degrees to 65 degrees, 65 degrees to 70 degrees, 70 degrees to 75 degrees, 75 degrees to 80 degrees, or 80 degrees to 85 degrees. In FIG. 2A, the first bounding box BB1 or the object to be detected in the image is not oriented either horizontally or vertically with respect to the horizontal axis HA of the image.

FIG. 2B illustrates a second bounding box for an object to be detected in an image in some embodiments according to the present disclosure. Referring to FIG. 2A and FIG. 2B, upon determination that the first bounding box of the object to be detected in the image is not oriented either horizontally or vertically with respect to the horizontal axis HA of the image, the method includes rotating the first bounding box BB1 to obtain a second bounding box BB2, which is oriented either horizontally or vertically with respect to the horizontal axis of the image. In a portion of image defined by the second bounding box BB2, the object to be detected is also oriented either horizontally or vertically with respect to the horizontal axis HA of the image. Referring to FIG. 2B, the orientation OR of the second bounding box or the object to be detected is at an angle of $\alpha 2$ with respect to the horizontal axis HA of the image, wherein $\alpha 2$ is in a range of 85 degrees to 90 degrees, or 0 degree to 5 degrees. As used herein, the term "oriented either horizontally or vertically with respect to the horizontal axis HA of the image" refers to an orientation at an angle in range of 85 degrees to 90 degrees, or 0 degree to 5 degrees, with respect to the horizontal axis HA of the image. In the context of the present disclosure, the second bounding box BB2 in some embodiments refers to a horizontally oriented bounding box.

In certain application scenarios such as retail product recognition, object detection typically is performed when the retail product is picked up by a customer and counted. The object to be detected could be arbitrarily oriented, for example, at a tilted angle (between 0 and 90 degrees) with respect to the horizontal axis of the image of the object. Using a non-horizontally-oriented bounding box (e.g., the first bounding box BB1 in FIG. 2A) during the object detection would introduce redundant information. In particular, when the application scenarios involves densely distributed objects, using the non-horizontally-oriented bounding box results in inadvertent inclusion of other objects in a portion of the image defined by the bounding box, interfering accurate detection of the object to be detected. The present method obviates these issues.

Related object detection methods require manual annotation of training data, which typically results in a large workload. For example, in one related object detection method, the related object detection model is based on CSL rotation angle classification algorithm, which decouples the connection between rotation angle and coordinates of the bounding box. The angle classification algorithm renders the model prediction layer heavy with increased modeling parameters. Moreover, the related object detection model is required to be re-trained every time a new object category is added, making it cumbersome and costly to update. In certain application scenarios, even when the packaging for a same object changes, the related object detection model is required to be re-trained. In the related object detection methods, model parameters have low reusability.

Few public data exists for training the detection model. Moreover, existing public data is typically provided with a simple background image and/or a single orientation such as horizontally or vertically oriented. Simulation generated training data may supplement the public data, with more complex background image and/or orientations. Generating training data by simulation obviates tedious manual annotation.

Figure 3:
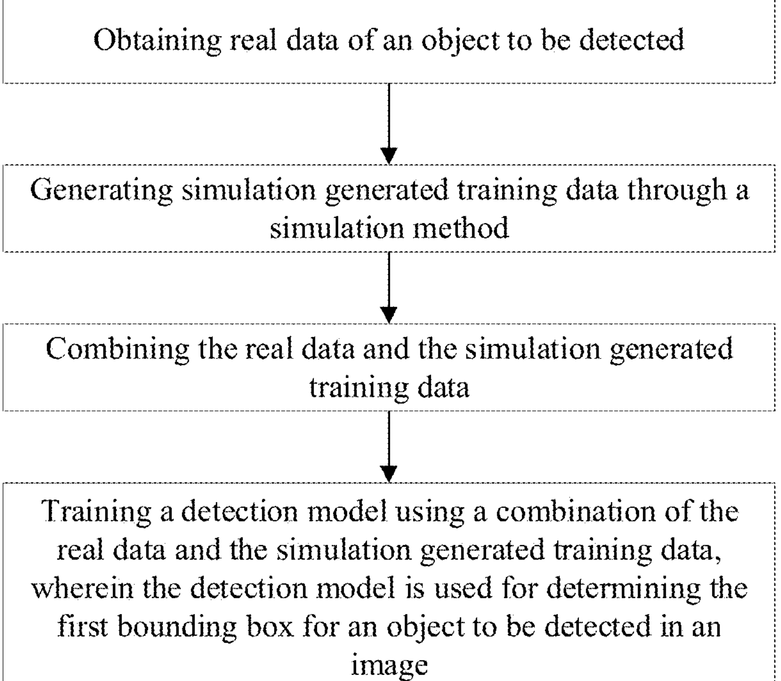
FIG. 3 is a flow chart illustrating a process of generating simulation generated training data in some embodiments according to the present disclosure.

Accordingly, the present method in some embodiments includes generating simulation generated training data through a simulation method based on real data. Thus, the present method can effectively expand the amount of training data without the need of tedious manual annotation. FIG. 3 is a flow chart illustrating a process of generating simulation generated training data in some embodiments according to the present disclosure. Referring to FIG. 3, the method in some embodiments includes obtaining real data of an object to be detected; generating simulation generated training data through a simulation method; combining the real data and the simulation generated training data; and training a detection model using a combination of the real data and the simulation generated training data, wherein the detection model is used for determining the first bounding box for an object to be detected in an image.

Figure 4A:
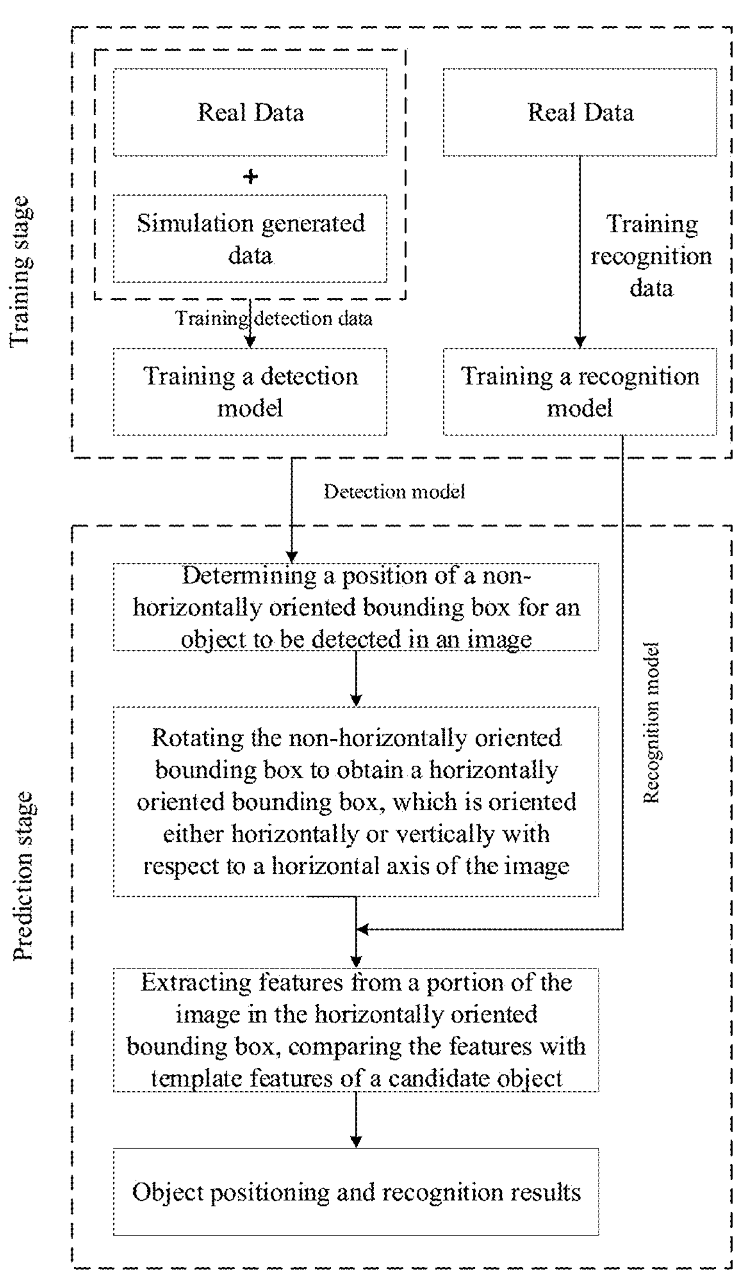
FIG. 4A is a flow chart illustrating a process of object detection in some embodiments according to the present disclosure.

FIG. 4A is a flow chart illustrating a process of object detection in some embodiments according to the present disclosure. Referring to FIG. 4A, in some embodiments, the process includes a training stage and a prediction stage. In the training stage, the method in some embodiments includes generating simulation generated training data through a simulation method based on real data. The amount of training data can be effectively expanded. A combination of the real data and simulation generated data is used as training detection data for training a detection model, e.g., a rotated object detection model. Subsequent to the training, the detection model may be used in the prediction stage.

In some embodiments, the real data is used as training recognition data for training a recognition model. Subsequent to the training, the recognition model may be used in the prediction stage.

In some embodiments, in the prediction stage, the method includes, using the detection model trained in the training stage, determining a position of a non-horizontally oriented bounding box for an object to be detected in an image, wherein the non-horizontally oriented bounding box and the object to be detected have a substantially the same orientation. As discussed above, in the image, the object to be detected could be arbitrarily oriented, for example, at a tilted angle (between 0 and 90 degrees) with respect to the horizontal axis of the image of the object. Using a non-horizontally-oriented bounding box (having a substantially the same orientation as the object to be detected) during the object detection would introduce redundant information. In particular, when the application scenarios involves densely distributed objects, using the non-horizontally-oriented bounding box results in inadvertent inclusion of other objects in the bounding box, interfering accurate detection of the object to be detected.

Figure 4B:
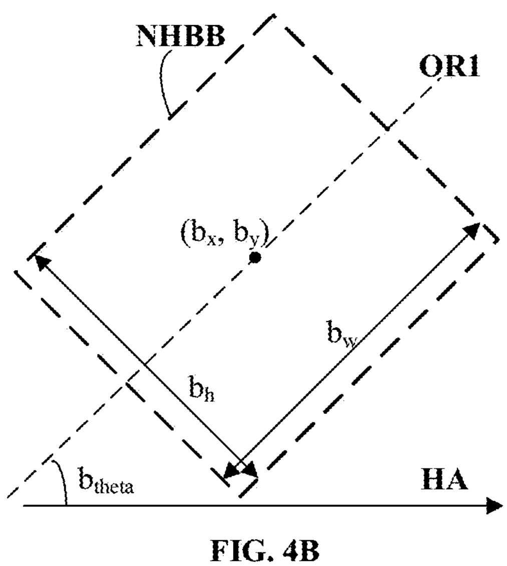
FIG. 4B illustrates a non-horizontally oriented bounding box in some embodiments according to the present disclosure.

Accordingly, referring to FIG. 4A, the method in the prediction stage further includes rotating the non-horizontally oriented bounding box to obtain a horizontally oriented bounding box, which is oriented either horizontally or vertically with respect to the horizontal axis of the image. In a portion of image defined $b_y$ the horizontally oriented bounding box, the object to be detected is also oriented either horizontally or vertically with respect to a horizontal axis of the image. By obtaining a horizontally oriented bounding box, redundant information and objects other than the object to be detected may be excluded from the bounding box during the prediction stage, enhancing the detection accuracy. FIG. 4B illustrates a non-horizontally oriented bounding box in some embodiments according to the present disclosure. In one example depicted in FIG. 4B, the non-horizontally oriented bounding box NHBB may be represented by ($b_x$, $b_y$, $b_w$, $b_h$, $b_{theta}$), wherein $b_x$ and $b_y$ stand for coordinates of the non-horizontally oriented bounding box NHBB, $b_w$ and $b_h$ stand for lengths of the long side and the short side of the non-horizontally oriented bounding box NHBB, and $b_{theta}$ stands for an angle of an orientation OR1 of the non-horizontally oriented bounding box NHBB with respect to a horizontal axis HA of the image (e.g., the original image in which the object to be detected is titled with respect to the horizontal axis of the image).

In some embodiments, the parameters of the non-horizontally oriented bounding box may be expressed as:

$$b_x = 2\sigma(t_x) - 0.5 + Cx; \tag{1}$$

$$b_y = 2\sigma(t_y) - 0.5 + Cy; \tag{2}$$

$$b_w = p_w(2\sigma(t_w))^2; \tag{3}$$

$$b_h = p_h(2\sigma(t_h))^2; \tag{4}$$

$$b_{theta} = (\sigma(t_{theta}) - 0.5) * \pi; \tag{5}$$

wherein $t_x$, $t_y$, $t_w$, $t_h$, $t_{theta}$ stand for a central coordinate of an anchor box output from a neural network, a box width of the anchor box, a box height of the anchor box, and an angle of an orientation of the anchor box with respect to a horizontal axis of the image; a stands for the Sigmoid activation function used to map the network prediction values; $t_x$, $t_y$, $t_w$, $t_h$ are between [0,1]; Cx, Cy are the offset in the cell grid relative to the top left corner of the image; $p_w$, $p_h$ are the a priori box width and height; $b_x$, $b_y$ stand for center coordinates of the non-horizontally oriented bounding box; $b_w$, $b_h$ stand for width and height of the non-horizontally oriented bounding box; and $b_{theta}$ stands for an angle of an orientation of the non-horizontally oriented bounding box with respect to a horizontal axis of the image.

In some embodiments, determining the first bounding box is performed by a neural network with a deep learning based object detection algorithm. Optionally, the neural network includes an output layer configured to output anchor boxes predicting bounding boxes using dimension clusters. In some embodiments, in the detection model according to the present disclosure; a respective anchor box includes a channel representing a value of an angle of an orientation of the first bounding box with respect to the horizontal axis of the image.

In some embodiments, the neural network with a deep learning based object detection algorithm for determining the first bounding box uses a loss function expressed as:

$$L_{total} = L_{obj} + L_{reg} = L_{obj} + L_c + L_{kf}; \tag{16}$$

wherein $L_{total}$ stands for total loss; $L_{obj}$ stands for confidence loss; Le stands for distance loss at the centroid; $L_{reg}=L_c+L_{kf}$; $L_{kf}=1-$KFIoU; and KFIoU is an approximation of skew intersection over union.

In some embodiments, the method in the prediction stage further includes, using the recognition model trained in the training stage, extracting features from a portion of the image in the horizontally oriented bounding box, and comparing the features extracted from portion of the image in the horizontally oriented bounding box with template features of a candidate object. As used herein, the term "feature" generally refers to information about an image or a portion of an image, including any localized optical characteristic in an image, e.g., a spot, a line, or a pattern. In one exemplary instance, a feature takes the form of spatial information defined by a vector and/or integer.

In some embodiments, the method in the prediction stage further includes outputting object positioning and recognition results.

Figure 5A:
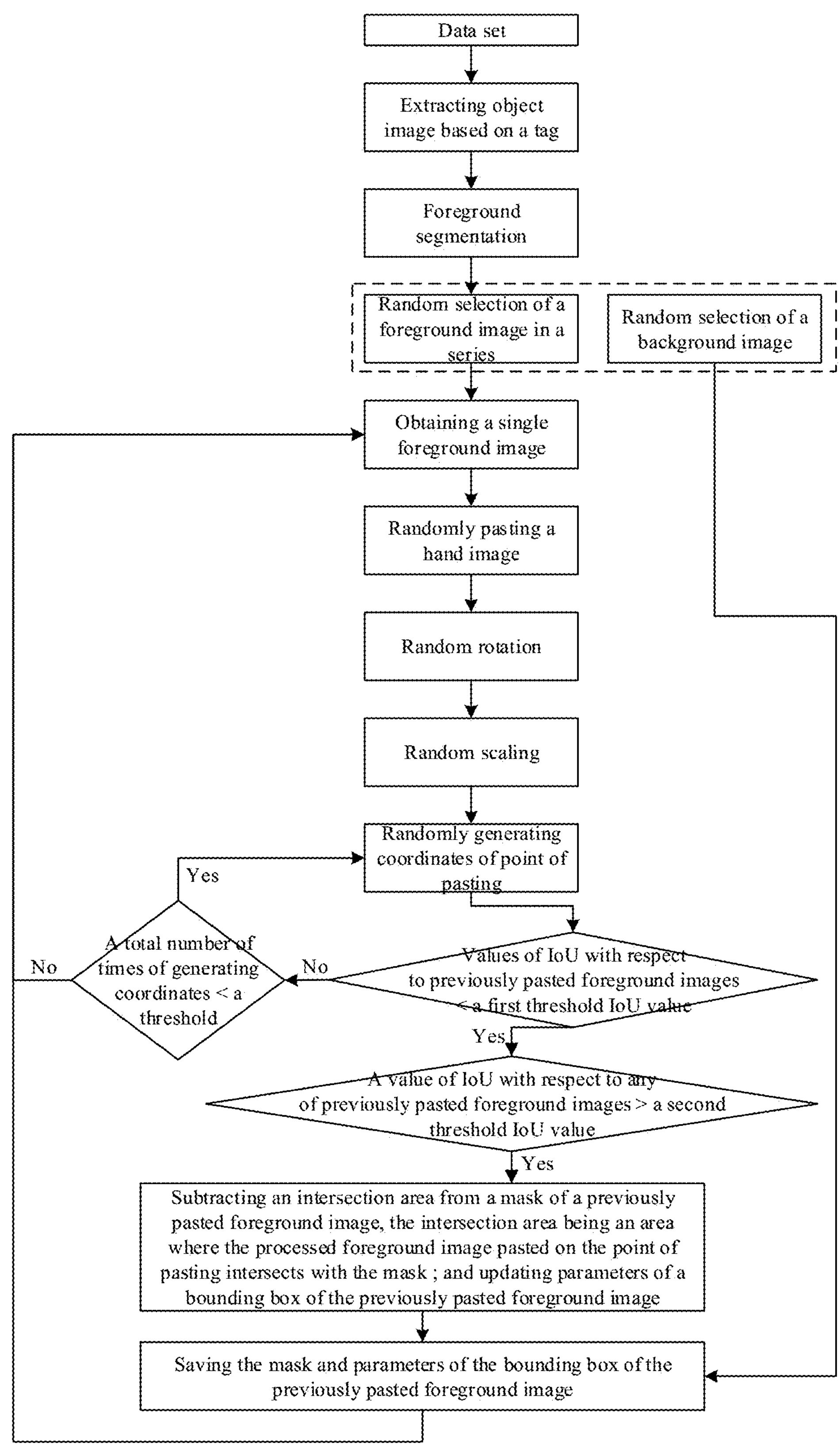
FIG. 5A is a flow chart illustrating a process of generating simulation generated data in some embodiments according to the present disclosure.

FIG. 5A is a flow chart illustrating a process of generating simulation generated data in some embodiments according to the present disclosure. Referring to FIG. 5A, the method in some embodiments includes obtaining a data set comprising real data of one or more objects. The data set may be a public data set such as a commercial data set. Alternatively, the data set may be obtained by crawling the web. The method in some embodiments further includes extracting object image based on a tag (e.g., a tag on the object to be detected); and performing foreground segmentation on the object image. Various appropriate algorithms may be used for performing foreground segmentation on the object image. Examples of algorithms include multiscale combinatorial grouping (MCG).

Upon foreground segmentation, the method further includes selecting (e.g., randomly) a foreground image in a series produced from the foreground segmentation, and selecting (e.g., randomly) a background image. By selecting a foreground image in the series, a single foreground image is obtained for simulation.

In one example, the method further includes one or more of randomly pasting a hand image on the single foreground image, performing a random rotation on the single foreground image, performing random scaling on the single foreground image, and randomly generating coordinates of a point of pasting a processed single foreground image on the background image. A point of pasting may be a point where a geometric central point of the processed single foreground image will be located after the pasting. In FIG. 5A, the above steps are performed according to an exemplary sequence. However, these steps may be performed in any appropriate alternative sequences. For example, random scaling may be performed prior to random rotation or prior to randomly pasting a hand image on the foreground image. Pasting a hand image on the foreground image is performed to simulate a scenario of a customer picking up a retail product. As used herein, the term "processed single foreground image" refers to a foreground image that is processed by one or more of a rotation process, a scaling process, and other image processing steps.

In order to avoid excessive overlapping between adjacent objects, an IoU threshold value is used for screening the processed single foreground image pasted on the point of pasting. Referring to FIG. 5A, the method in some embodiments further includes determining whether ratio values of IoU between the processed single foreground image pasted on the point of pasting and one or more previously pasted foreground images are less than a first threshold IoU value.

In one example, the ratio values of IoU may be calculated using, e.g., a left upper corner of the processed single foreground image as the point of pasting. In another example, the method includes determining whether ratio values of IoU between the processed single foreground image pasted on the point of pasting and all previously pasted foreground images are less than the first threshold IoU value. Exemplary first threshold IoU values include 0.10, 0.15, 0.20, 0.25, 0.30, 0.35, 0.40, 0.45, and 0.50.

Upon determination that ratio values of IoU between the processed single foreground image pasted on the point of pasting and one or more (e.g., all) previously pasted foreground images are equal to or greater than the first threshold IoU value, the method in some embodiments includes determining whether a total number of times of generating coordinates of a point of pasting is less than a threshold value. If the total number of times of generating coordinates of a point of pasting is less than the threshold value, and ratio values of IoU between the processed single foreground image pasted on the point of pasting and one or more (e.g., all) previously pasted foreground images are equal to or greater than the first threshold IoU value, the method further includes repeating the step of randomly generating coordinates of a point of pasting the processed single foreground image.

Upon determination that ratio values of IoU between the processed single foreground image pasted on the point of pasting and one or more (e.g., all) previously pasted foreground images are less than the first threshold IoU value, the method in some embodiments further includes determining whether a ratio value of IoU between the processed single foreground image pasted on the point of pasting and any of the previously pasted foreground images is greater than a second threshold IoU value. Exemplary second threshold IoU values include 0.01, 0.02, 0.03, 0.04, 0.05, 0.06, 0.07, 0.08, 0.09, and 0.10. Optionally, the first threshold IoU value is greater than the second threshold IoU value.

Figure 5B:
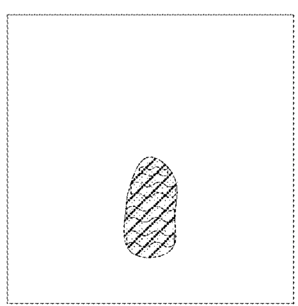
FIG. 5B to FIG. 5G illustrate a process of obtaining updated parameters of an updated bounding box of the previously pasted foreground image.
Figure 5C:
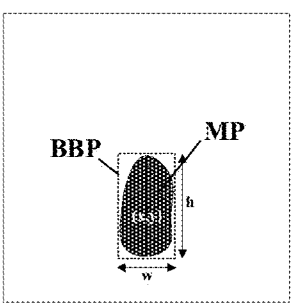
Figure 5D:
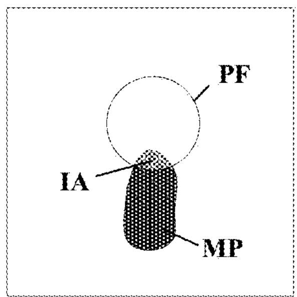
Figure 5E:
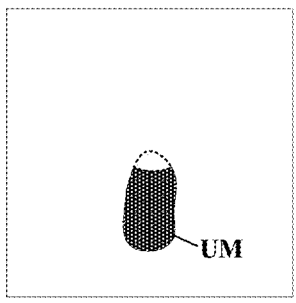
Figure 5F:
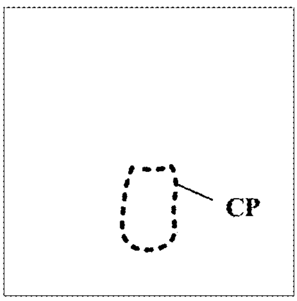
Figure 5G:
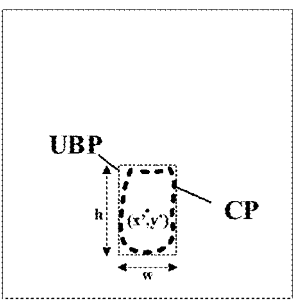

FIG. 5B to FIG. 5G illustrate a process of obtaining updated parameters of an updated bounding box of the previously pasted foreground image. FIG. 5B shows a previously pasted foreground image, and FIG. 5C shows a mask MP of a previously pasted foreground image, and a bounding box BBP of the previously pasted foreground image. The parameters of the bounding box BBP of the previously pasted foreground image include at least a coordinate (x, y), a width w of the bounding box BBP, and a height h of the bounding box BBP. Referring to FIG. 5D, upon determination that the ratio values of IoU between the processed single foreground image pasted on the point of pasting and any of the previously pasted foreground images are greater than a second threshold IoU value, the method in some embodiments further includes subtracting an intersection area IA from a mask MP of a previously pasted foreground image, the intersection area IA being an area where the processed foreground image PF pasted on the point of pasting intersects with the mask MP; and updating parameters of a bounding box of the previously pasted foreground image. Referring to FIG. 5E, an updated mask UM of the previously pasted foreground image is generated. Referring to FIG. 5F, the method in some embodiments further includes extracting contour points CP of the updated mask. Referring to FIG. 5G, based on the contour points CP extracted from the updated mask, a minimum bounding box (e.g., a minimum outer rectangle) is obtained and converted into a long side format (in which an included angle refers to an angle between the long side and the horizontal axis of the image), thereby obtaining the updated parameters of an updated bounding box UBP of the previously pasted foreground image. The updated parameters include at least a coordinate (x', y'), a width w of the updated bounding box UBP, and a height h of the updated bounding box UBP. As used herein, the term "mask" refers to a derivative of an image or a portion of an image wherein each pixel in the mask is represented as a binary value. For example, a mask can be generated from an image or a portion of an image by assigning all pixels of the image or the portion of the image with an intensity value above a threshold value to true, and otherwise false.

Various appropriate implementations of pasting the processed single foreground image on a background image may be practiced. In one example, a sparse pasting may be used, with the restriction that IoU values between the processed single foreground image pasted on the point of pasting and all previously pasted foreground images are less than a third threshold IoU value. As used herein, all previously pasted foreground images may be images of objects previously pasted on the background image. When the sparse pasting method is used, the third threshold IoU value may be a relatively small value, e.g., 0.35.

In another example, a dense pasting may be used, with the restriction that IoU values between the processed single foreground image pasted on the point of pasting and all previously pasted foreground images are greater than a fourth threshold IoU value and less than a fifth threshold IoU value. The dense pasting method simulates a scenario of retail product recognition in which multiple retail products are densely arranged. The fourth threshold IoU value is set to ensure a densely distributed objects. The fifth threshold IoU value is set to avoid excessive intersection between adjacent objects.

In another example, a parallel pasting may be used. In the parallel pasting, multiple objects are combined as a unit, in which the multiple objects are arranged in a certain format, e.g., horizontally arranged, or vertically arranged. A sparse pasting of the unit is then performed, which includes pasting a respective unit of all units in a sparse pasting manner, wherein ratio values of IoU between the respective unit pasted and all previously pasted units are less than a sixth threshold IoU value.

Figure 6A:
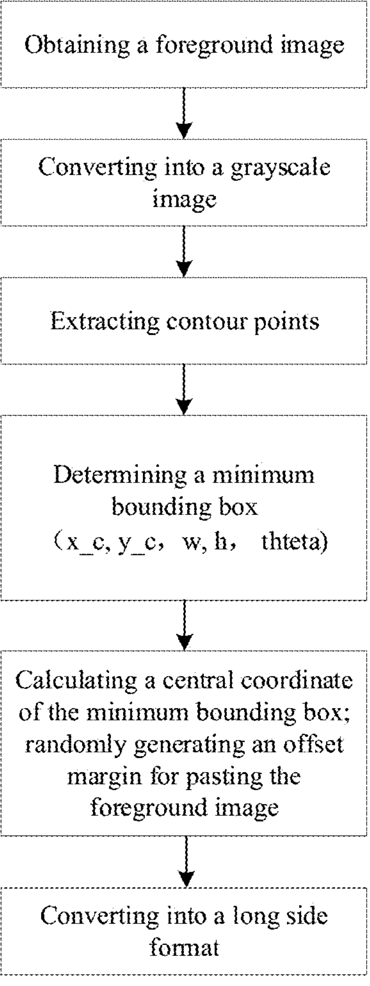
FIG. 6A is a flow chart illustrating a process of updating parameters of a bounding box of a foreground image in some embodiments according to the present disclosure.
Figure 6B:
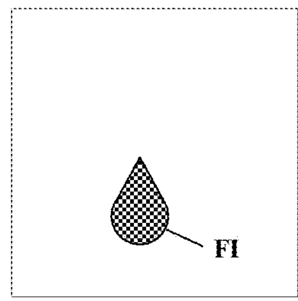
FIG. 6B to FIG. 6E depict a process of updating parameters of a bounding box of a foreground image in some embodiments according to the present disclosure.
Figure 6C:
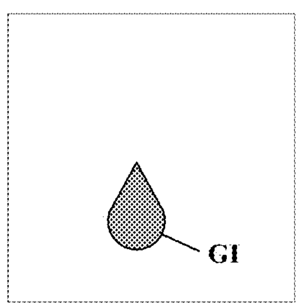
Figure 6D:
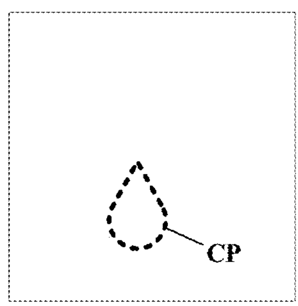
Figure 6E:
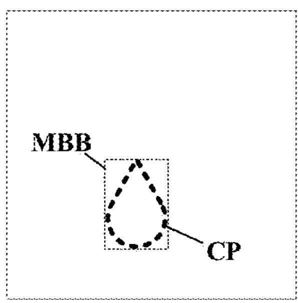

FIG. 6A is a flow chart illustrating a process of updating parameters of a bounding box of a foreground image in some embodiments according to the present disclosure. FIG. 6B to FIG. 6E depict a process of updating parameters of a bounding box of a foreground image in some embodiments according to the present disclosure. Referring to FIG. 6A to FIG. 6E, the method in some embodiments includes obtaining a foreground image FI (e.g., a previously pasted foreground image, or a previously pasted foreground image subject to subtraction of an intersection area); converting the foreground image FI into a grayscale imageGI; extracting contour points CP of the grayscale image GI; determining a minimum bounding box MBB such as a minimum outer rectangle. As used herein, the minimum bounding box may be determined as a box with the smallest measure (e.g., the smallest area) within which all of the grayscale image GI lie. The minimum bounding box MBB may be oriented horizontally or non-horizontally. In one example, the minimum outer rectangle may be represented by ($mb_x$, $mb_y$, $mb_y$, $mb_h$, $mb_{theta}$), wherein $mb_x$ and $mb_y$ stand for coordinates of the minimum outer rectangle, $mb_w$ and $mb_h$ stand for lengths of the long side and the short side of the minimum outer rectangle, and $mb_{theta}$ stands for an angle of an orientation of the minimum outer rectangle with respect to a horizontal axis of the image. The method in some embodiments further includes calculating a central coordinate (e.g., a coordinate of a geometric central point) of the minimum bounding box; randomly generating an offset margin for pasting the foreground image; and converting the minimum bounding box into a long side format.

In one example, the offset margin (x', y') for pasting the foreground image may be generated in a range defined below:

x coordinate is in a range of $$\left(\frac{Fw}{2}, \frac{(Bw - Fw)}{2}\right);$$

y coordinate is in a range of $$\left(\frac{Fh}{2}, \frac{(Bh - Fh)}{2}\right);$$

wherein Fw stands for a width of the foreground image, Bw stands for a width of the background image, Fh stands for a height of the foreground image, Bh stands for a height of the background image.

In some embodiments, the offset margin is added to the central coordinate of a foreground image to be pasted, thereby determining a point of pasting the foreground image on the background image.

In some embodiments, the parameters of the minimum outer rectangle (as an example of the minimum bounding box MBB) may be expressed as:

$$mb_x = 2\sigma(mt_x) - 0.5 + Cx; \quad (6)$$

$$mb_y = 2\sigma(mt_y) - 0.5 + Cy; \quad (7)$$

$$mb_w = mp_w(2\sigma(mt_w))^2; \quad (8)$$

$$mb_h = mp_h(2\sigma(mt_h))^2; \quad (9)$$

$$mb_{theta} = (\sigma(mt_{theta}) - 0.5) * \pi; \quad (10)$$

wherein $mt_x$, $mt_y$, $mt_w$, $mt_h$, $mt_{theta}$ stand for a central coordinate of an anchor box output from a neural network, a box width of the anchor box, a box height of the anchor box, and an angle of an orientation of the anchor box with respect to a horizontal axis of the image; a stands for the Sigmoid activation function used to map the network prediction values; $mt_x$, $mt_y$, $mt_w$, $mt_h$ are between [0,1]; Cx, Cy are the offset in the cell grid relative to the top left corner of the image; $mp_w$, $mp_h$ are the a priori box width and height; $b_x$, $b_y$ stand for center coordinates of the minimum outer rectangle; $mb_w$, $mb_h$ stand for width and height of the minimum outer rectangle; and $mb_{theta}$ stands for an angle of an orientation of the minimum outer rectangle with respect to a horizontal axis of the image.

Figure 7:
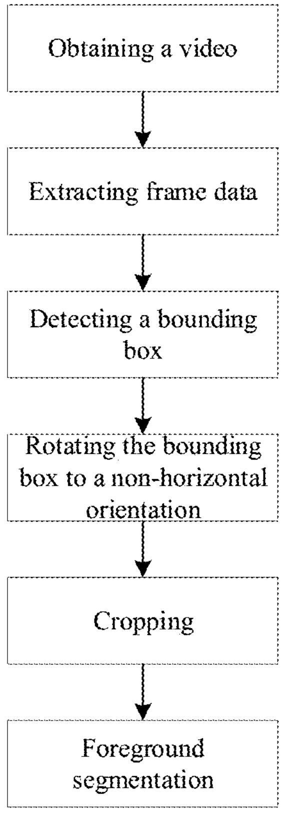
FIG. 7 is a flow chart illustrating a process of generating additional data in some embodiments according to the present disclosure.

Various appropriate methods may be used for generating additional data to be supplemented into the training detection data. In one example, a video of an object may be captured using a camera. Images of the object in the video may be captured at various appropriate angles. FIG. 7 is a flow chart illustrating a process of generating additional data in some embodiments according to the present disclosure. Referring to FIG. 7, the method in some embodiments includes obtaining a video of an object; extracting frame data from the video; and detecting a bounding box from a frame of image. In one example, the step of detecting the bounding box from the frame of image may be performed using the detection model trained according to the present disclosure, e.g., a detection model trained as illustrated in FIG. 4A. In one example, the initial bounding box detected from the frame of image is a non-horizontally oriented bounding box, and the method further includes rotating the non-horizontally oriented bounding box to obtain a horizontally oriented bounding box, which is oriented either horizontally or vertically with respect to a horizontal axis of the image. By obtaining a horizontally oriented bounding box, redundant information, and objects other than the object to be detected may be excluded from the bounding box during the prediction stage, enhancing the detection accuracy. Upon obtaining the horizontally oriented bounding box, the frame of image is cropped to extract an object image, followed by foreground image segmentation. Subsequently, the foreground image may be processed according to the present disclosure as discussed above, e.g., in connection with FIG. 5A. The additional data may provide object images at certain angles, e.g., from a bottom view.

In another example, the present method includes establishing a rotated object detection model using an object detection algorithm such as a single-stage deep learning based object detection algorithm (for example, yolo including yolov5). In another example, the present method further includes realizing regression of the bounding box using an intersection-over-union loss function (e.g., SkewIoU loss function, KFIoU loss function). As compared to the related object detection model based on CSL rotation angle classification algorithm, the present method significantly reduce modeling parameters required in the object detection process.

In another example, the present method decouples classification of the object and positioning of the object. As used herein, the term "decouple" means classification of the object does not exclusively depend on the positioning of the object. In one example, the classification of the object and the positioning of the object are independent from each other.

Various appropriate algorithms may be used for establishing the detection model. In one example, the rotated object detection model may be established using an object detection algorithm such as a deep learning-based object detection algorithm. Examples of object detection algorithms include any suitable two-stage object detection algorithms and any suitable one-stage object detection algorithms. Examples of appropriate object detection algorithms include yolo, SSD, RCNN, Fast RCNN, Faster-RCNN, and CenterNet.

Figure 8:
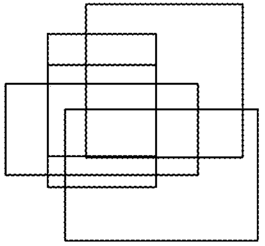
FIG. 8 illustrate anchor boxes output from an output layer of a neural network in some embodiments according to the present disclosure.

In some embodiments, the detection model comprises a neural network. In some embodiments, the neural network includes an output layer configured to output anchor boxes predicting bounding boxes using dimension clusters. FIG. 8 illustrate anchor boxes output from an output layer of a neural network in some embodiments according to the present disclosure. In some embodiments, in the detection model according to the present disclosure, a respective anchor box includes an additional channel representing a regression value of the angle. As used herein, the term "neural network" refers to a network used for solving artificial intelligence (AI) problems. A neural network includes a plurality of hidden layers. A respective one of the plurality of hidden layers includes a plurality of neurons (e.g., nodes). A plurality of neurons in a respective one of the plurality of hidden layers are connected with a plurality of neurons in an adjacent one of the plurality of hidden layers.

Connects between neurons have different weights. The neural network has a structure mimics a structure of a biological neural network. The neural network can solve problems using a non-deterministic manner. Parameters of the neural network can be tuned by pre-training, for example, a large number of problems are input in the neural network, and results are obtained from the neural network. Feedbacks on these results is fed back into the neural network to allow the neural network to tune the parameters of the neural network. The pre-training allows the neural network to have a stronger problem-solving ability. As used herein, the term "channel" is used to indicate a signal path in a neural network.

In one example, the anchor box may be represented by (x_c, y_c, long, short, angle), wherein x_c and y_x stand for coordinates of the anchor box, long and short stand for lengths of the long side and the short side of the anchor box, and angle stands for an angle of an orientation of the anchor box with respect to a horizontal axis of the image (e.g., the original image in which the object to be detected is titled with respect to the horizontal axis of the image).

In another example, the angle is represented in a long side format, for example, the angle is an included angle between the long side and the horizontal axis of the image.

In some embodiments, the bounding box predicted by the neural network may be represented by ($b_x$, $b_y$, $b_w$, $b_h$, $b_{theta}$). In some embodiments, the parameters of the bounding box may be expressed as:

$$bx = 2\sigma(t_x) - 0.5 + Cx; \quad (11)$$

$$by = 2\sigma(t_y) - 0.5 + Cy; \quad (12)$$

$$bw = p_w(2\sigma(t_w))^2; \quad (13)$$

$$bh = p_h(2\sigma(t_h))^2; \quad (14)$$

$$b_{theta} = (\sigma(t_{theta}) - 0.5) * \pi; \quad (15)$$

wherein $t_x$, $t_y$, $t_w$, $t_h$, $t_{theta}$ stand for a central coordinate of an anchor box output from a neural network, a box width of the anchor box, a box height of the anchor box, and an angle of an orientation of the anchor box with respect to a horizontal axis of the image; a stands for the Sigmoid activation function used to map the network prediction values; $t_x$, $t_y$, $t_w$, $t_h$ are between [0,1]; Cx, Cy are the offset in the cell grid relative to the top left corner of the image; $p_w$, $p_h$ are the a priori box width and height; $b_x$, $b_y$ stand for center coordinates of the bounding box; $b_w$, $b_h$ stand for width and height of the bounding box; and $b_{theta}$ stands for an angle of an orientation of the bounding box with respect to a horizontal axis of the image.

In some embodiments, the neural network uses a loss function expressed as:

$$L_{total} = L_{obj} + L_{reg} = L_{obj} + L_c + L_{kf}; \quad (16)$$

wherein $L_{obj}$ stands for confidence loss. In one example, the confidence loss is BCE Loss. Optionally, the BCE Loss is expressed as $L_{BCE}$–[y log(σ(x))+(1−y) log(1−σ(x))](17);

wherein $L_{BCE}$ stands for BCE loss; σ stands for Sigmoid activation function; x stands for a confidence level of the bounding box predicted by the neural network; and y stands for a confidence level truth value. In one example, y has a confidence level truth value of 0 or 1. For example, when the ratio value of IoU is equal to or greater than 0.5, y=1; while when the ratio value of IoU is less than 0.5, y=0. In another example, an object detection algorithm such as yolov5 is used, the confidence level truth value is a ratio value of IoU between a present bounding box and a truth bounding box.

In some embodiments, $L_{reg}=L_c+L_{kf}$, $L_{kf}=1-$KFIoU; Le stands for distance loss at the centroid and SmothL1 loss is used. KFIoU is an approximation of skew intersection over union (SkewIoU), using a Gaussian distribution to simulate the computational process of SkewIoU in which no hyper-parameters are introduced.

Figure 9:
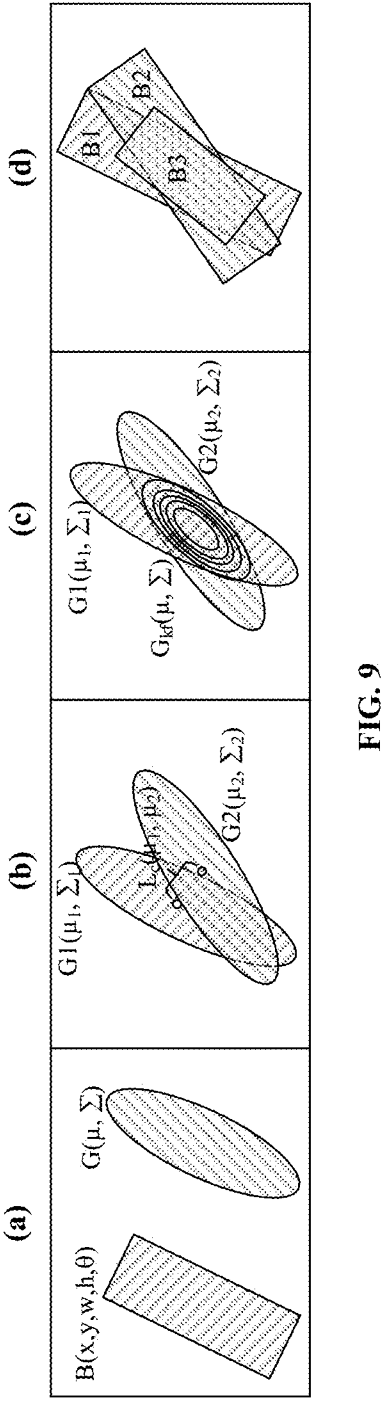
FIG. 9 illustrates a SkewIoU approximation process in two-dimensional space based on Kalman filter.

FIG. 9 illustrates a SkewIoU approximation process in two-dimensional space based on Kalman filter. Referring to FIG. 9, in step (a), the bounding box is converted into a Gaussian distribution. In the process depicted in step (a):

$$\mu = (x, y)^T;$$

$$R = \begin{pmatrix} \cos\theta & -\sin\theta \\ \sin\theta & \cos\theta \end{pmatrix};$$

$$\sum = R \wedge R^T; \text{ and}$$

$$\Lambda = \begin{pmatrix} w^2/4 & 0 \\ 0 & h^2/4 \end{pmatrix}.$$

Referring to step (b) of FIG. 9, the center distance is narrowed by center point loss. In the process depicted in step (b):

$$L_c(\mu_1, \mu_2) = \sum\nolimits_{i \in \{x,y\}}^{n} l_n(t_i, t_i').$$

Referring to step (c) of FIG. 9, the Gaussian distribution of the overlapping area is obtained by Kalman filtering. In the process depicted in step (c):

$$\alpha G_{kf}\left(\mu, \sum\right) = G_1\left(\mu_1, \sum\nolimits_1\right) G_2\left(\mu_2, \sum\nolimits_2\right);$$

$$K = \sum\nolimits_1 \left(\sum\nolimits_1 + \sum\nolimits_2\right)^{-1};$$

$$\mu = \mu_1 + K(\mu_2 - \mu_1); \text{ and}$$

$$\sum = \sum\nolimits_1 - K \sum\nolimits_1.$$

Referring to step (d) of FIG. 9, the Gaussian distribution is inverted to a bounding box to calculate approximate_SkewIoU. In the process depicted in step (d):

$$Aera_B\left(\sum\right) = \sqrt[4]{\prod eig\left(\sum\right)};$$

$$KFIoU = \frac{Aera_{B_3}\left(\sum\right)}{Aera_{B_1}\left(\sum_1\right) + Aera_{B_2}\left(\sum_2\right) - Aera_{B_3}\left(\sum\right)}; \text{ and}$$

$$L_{kf}\left(\sum\nolimits_1, \sum\nolimits_2\right) = 1 - KFIoU.$$

In another example, the present method further includes establishing a feature extraction model using a backbone neural network such as MobileNet (e.g., MobileNetv1, MobileNetv2, or MobileNetv3); and comparing the extracted features of the object to be detected with template features for a candidate object for similarity, thereby classifying the object to be detected. As compared to the related object detection methods, the present method obviates the need of re-training the object detection model.

Various appropriate recognition models may be used in the method according to the present disclosure. In one example, the present method uses MobileNetv3 as the recognition model. In another example, the recognition model uses triplet loss as the loss function. In some embodiments, data with a large number of categories (e.g., a number of categories >5 k) are used for training the recognition model.

In testing the recognition model, an image output from the detection model is input to the recognition model, which extracts features of the object (e.g., a retail product). The extracted features are used for calculating cosine similarity with pre-defined template features. The template category corresponding to a value of cosine similarity greater than a threshold value as the result of recognition. Template categories corresponding to ratio values of cosine similarity less than the threshold value are recognized as irrelevant categories.

Figure 10:
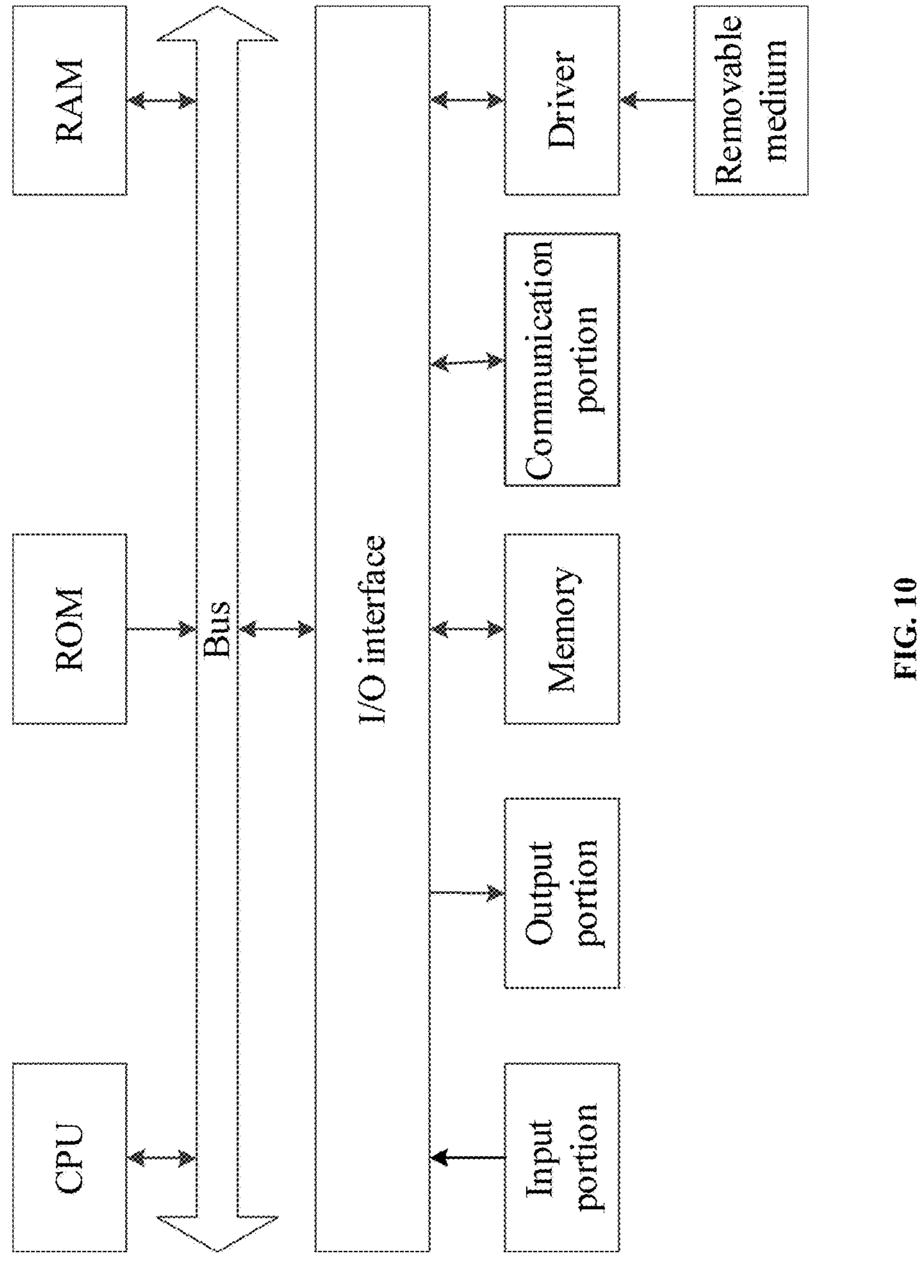
FIG. 10 is a schematic diagram of a structure of an apparatus in some embodiments according to the present disclosure.

In another aspect, the present disclosure provides an apparatus. FIG. 10 is a schematic diagram of a structure of an apparatus in some embodiments according to the present disclosure. Referring to FIG. 10, in some embodiments, the apparatus includes the central processing unit (CPU) configured to perform actions according to the computer-executable instructions stored in a ROM or in a RAM. Optionally, data and programs required for a computer system are stored in RAM. Optionally, the CPU, the ROM, and the RAM are electrically connected to each other via bus. Optionally, an input/output interface is electrically connected to the bus.

In some embodiments, the apparatus includes a memory, and one or more processors, wherein the memory and the one or more processors are connected with each other. In some embodiments, the memory stores computer-executable instructions for controlling the one or more processors to determine a first bounding box for an object to be detected in an image, wherein the first bounding box and the object to be detected have a substantially the same orientation; determine whether first bounding box of the the object to be detected in the image is oriented either horizontally or vertically with respect to a horizontal axis of the image; upon determination that the first bounding box of the object to be detected in the image is not oriented either horizontally or vertically with respect to the horizontal axis of the image, rotate the first bounding box to obtain a second bounding box, which is oriented either horizontally or vertically with respect to the horizontal axis of the image; extract features from a portion of the image in the second bounding box; compare the features extracted from the portion of the image in second bounding box with template features of a candidate object; and upon determination the features extracted from the second bounding box are similar to the template features of the candidate object, output a position of the object to be detected and feature recognition results.

In some embodiments, the first bounding box is represented $b_y$ a dimension cluster ($b_x$, $b_y$, $b_w$, $b_h$, $b_{theta}$); wherein $b_x$ and $b_y$ stand for coordinates of the first bounding box; $b_w$ and $b_h$ stand for lengths of a long side and a short side of the second bounding box; and $b_{theta}$ stands for an angle of an orientation of the first bounding box with respect to the horizontal axis of the image.

In some embodiments, the parameters of the first bounding box (e.g., the non-horizontally oriented bounding box) may be expressed as:

$$b_x = 2\sigma(t_x) - 0.5 + Cx; \quad (1)$$

$$b_y = 2\sigma(t_y) - 0.5 + Cy; \quad (2)$$

$$b_w = p_w(2\sigma(t_w))^2; \quad (3)$$

$$b_h = p_h(2\sigma(t_h))^2; \quad (4)$$

$$b_{theta} = (\sigma(t_{theta}) - 0.5) * \pi; \quad (5)$$

wherein $t_x$, $t_y$, $t_w$, $t_h$, $t_{theta}$ stand for a central coordinate of an anchor box output from a neural network, a box width of the anchor box, a box height of the anchor box, and an angle of an orientation of the anchor box with respect to a horizontal axis of the image; a stands for the Sigmoid activation function used to map the network prediction values; $t_x$, $t_y$, $t_w$, $t_h$ are between [0,1]; Cx, Cy are the offset in the cell grid relative to the top left corner of the image; $p_w$, $p_h$ are the a priori box width and height; $b_x$, $b_y$ stand for center coordinates of the second bounding box; $b_w$, $b_h$ stand for width and height of the second bounding box; and $b_{theta}$ stands for an angle of an orientation of the second bounding box with respect to the horizontal axis of the image.

In some embodiments, the object detection apparatus includes a neural network configured to determine the first bounding box. In some embodiments, the neural network includes an output layer configured to output anchor boxes predicting bounding boxes. Optionally, a respective anchor box includes a channel representing a value of an angle of an orientation of the first bounding box with respect to the horizontal axis of the image.

In some embodiments, the neural network uses a loss function expressed as $$L_{total} = L_{obj} + L_{reg} = L_{obj} + L_c + L_{kf}; \quad (16)$$

wherein $L_{total}$ stands for total loss; $L_{obj}$ stands for confidence loss; Le stands for distance loss at the centroid; $L_{reg}=L_c+L_{kf}$; $L_{kf}=1-\text{KFIoU}$; and KFIoU is an approximation of skew intersection over union.

In some embodiments, the memory further stores computer-executable instructions for controlling the one or more processors to obtain real data of an object to be detected; generate simulation generated training data through a simulation method based on the real data; combine the real data and the simulation generated training data; and train a detection model using a combination of the real data and the simulation generated training data.

In some embodiments, in order to generate the simulation generated training data, the memory further stores computer-executable instructions for controlling the one or more processors to extract object image from the real data; perform foreground segmentation on the object image; obtain a single foreground image; and paste multiple single foreground images on a background image, thereby generating the training data.

In some embodiments, the memory further stores computer-executable instructions for controlling the one or more processors to perform one or more of randomly pasting a hand image on the foreground image; performing a random rotation on the single foreground image; and performing random scaling on the single foreground image; thereby obtaining a processed single foreground image. These steps may be performed in any appropriate alternative sequences. For example, random scaling may be performed prior to random rotation or prior to randomly pasting a hand image on the foreground image. Pasting a hand image on the foreground image is performed to simulate a scenario of a customer picking up a retail product.

In some embodiments, in order to generate the simulation generated training data, the memory further stores computer-executable instructions for controlling the one or more processors to randomly generate coordinates of a point of pasting a processed single foreground image on the background image; and determine whether ratio values of IoU between the processed single foreground image pasted on the point of pasting and one or more previously pasted foreground images are less than a first threshold IoU value. In one example, the ratio values of IoU may be calculated using, e.g., a left upper corner of the processed single foreground image as the point of pasting. In another example, the memory further stores computer-executable instructions for controlling the one or more processors to determine whether ratio values of IoU between the processed single foreground image pasted on the point of pasting and all previously pasted foreground images are less than the first threshold IoU value. Exemplary first threshold IoU values include 0.10, 0.15, 0.20, 0.25, 0.30, 0.35, 0.40, 0.45, and 0.50.

In some embodiments, the memory further stores computer-executable instructions for controlling the one or more processors to, upon determination that the ratio values of IoU between the processed single foreground image pasted on the point of pasting and all previously pasted foreground images are less than the first threshold IoU value, determine whether a ratio value of IoU between the processed single foreground image pasted on the point of pasting and any of the previously pasted foreground images is greater than a second threshold IoU value. Exemplary second threshold IoU values include 0.01, 0.02, 0.03, 0.04, 0.05, 0.06, 0.07, 0.08, 0.09, and 0.10.

In some embodiments, in order to generate the simulation generated training data, the memory further stores computer-executable instructions for controlling the one or more processors to, upon determination that the ratio values of IoU between the processed single foreground image pasted on the point of pasting and a respective previously pasted foreground image of the previously pasted foreground images are greater than a second threshold IoU value, subtract an intersection area from a mask of the respective previously pasted foreground image, the intersection area being an area where the processed foreground image pasted on the point of pasting intersects with the mask; and update parameters of a respective bounding box of the respective previously pasted foreground image, thereby obtaining updated parameters of an updated bounding box of the previously pasted foreground image. An updated mask of the previously pasted foreground image is generated. Optionally, the memory further stores computer-executable instructions for controlling the one or more processors to extract contour points of the updated mask. Based on the contour points extracted from the updated mask, a minimum bounding box (e.g., a minimum outer rectangle) is obtained and converted into a long side format, thereby obtaining the updated parameters of an updated bounding box of the previously pasted foreground image.

In some embodiments, the memory further stores computer-executable instructions for controlling the one or more processors to, upon determination that none of the ratio values of IoU between the processed single foreground image pasted on the point of pasting and all previously pasted foreground images is less than the first threshold IoU value, determine whether a total number of times of generating coordinates of point of pasting is less than a threshold value. If the total number of times of generating coordinates of a point of pasting is less than the threshold value, and ratio values of IoU between the processed single foreground image pasted on the point of pasting and one or more (e.g., all) previously pasted foreground images are equal to or greater than the first threshold IoU value, the memory further stores computer-executable instructions for controlling the one or more processors to repeat the step of randomly generating coordinates of a point of pasting the processed single foreground image.

In some embodiments, the memory further stores computer-executable instructions for controlling the one or more processors to paste a respective processed single foreground image of all processed single foreground images on a background image in a sparse pasting manner, wherein ratio values of IoU between the respective processed single foreground image and all previously pasted foreground images are less than a third threshold IoU value.

In some embodiments, the memory further stores computer-executable instructions for controlling the one or more processors to paste a respective processed single foreground image of all processed single foreground images on a background image in a dense pasting manner, wherein ratio values of IoU between the respective processed single foreground image and all previously pasted foreground images are greater than a fourth threshold IoU value and less than a fifth threshold IoU value.

In some embodiments, the memory further stores computer-executable instructions for controlling the one or more processors to combine multiple objects as a unit, in which the multiple objects are arranged in a certain format; and paste a respective unit of all units on a background image in a sparse pasting manner, wherein ratio values of IoU between the respective unit pasted and all previously pasted units are less than a sixth threshold IoU value.

In some embodiments, in order to compare the features extracted from the second bounding box with template features of a candidate object the memory further stores computer-executable instructions for controlling the one or more processors to calculate cosine similarity between the features extracted from the second bounding box with the template features of the candidate object; and, upon determination a value of the cosine similarity is greater than a threshold similarity value, output the position of the object to be detected and the feature recognition results.

In another aspect, the present disclosure provides a computer-readable medium having computer-readable instructions thereon. In some embodiments, the computer-readable instructions being executable by a processor to cause the processor to perform determining a first bounding box for an object to be detected in an image, wherein the first bounding box and the object to be detected have a substantially the same orientation; determining whether the first bounding box of the object to be detected in the image is oriented either horizontally or vertically with respect to a horizontal axis of the image; upon determination that the first bounding box of the object to be detected in the image is not oriented either horizontally or vertically with respect to the horizontal axis of the image, rotating the first bounding box to obtain a second bounding box, which is oriented either horizontally or vertically with respect to the horizontal axis of the image; extracting features from a portion of the image in the second bounding box; comparing the features extracted from the portion of the image in second bounding box with template features of a candidate object; and, upon determination the features extracted from the second bounding box are similar to the template features of the candidate object, outputting a position of the object to be detected and feature recognition results.

In some embodiments, the first bounding box is represented by a dimension cluster ($b_x$, $b_y$, $b_w$, $b_h$, $b_{theta}$); wherein $b_x$ and $b_y$ stand for coordinates of the first bounding box; $b_w$ and $b_h$ stand for lengths of a long side and a short side of the second bounding box; and $b_{theta}$ stands for an angle of an orientation of the first bounding box with respect to the horizontal axis of the image.

In some embodiments, the parameters of the first bounding box (e.g., the non-horizontally oriented bounding box) may be expressed as:

$$b_x = 2\sigma(t_x) - 0.5 + Cx; \quad (1)$$

$$b_y = 2\sigma(t_y) - 0.5 + Cy; \quad (2)$$

$$b_w = p_w(2\sigma(t_w))^2; \quad (3)$$

$$b_h = p_h(2\sigma(t_h))^2; \quad (4)$$

$$b_{theta} = (\sigma(t_{theta}) - 0.5) * \pi; \quad (5)$$

wherein $t_x$, $t_y$, $t_w$, $t_h$, $t_{theta}$ stand for a central coordinate of an anchor box output from a neural network, a box width of the anchor box, a box height of the anchor box, and an angle of an orientation of the anchor box with respect to a horizontal axis of the image; a stands for the Sigmoid activation function used to map the network prediction values; $t_x$, $t_y$, $t_w$, $t_h$ are between [0,1]; Cx, Cy are the offset in the cell grid relative to the top left corner of the image; $p_w$, $p_h$ are the a priori box width and height; $b_x$, $b_y$ stand for center coordinates of the second bounding box; $b_w$, $b_h$ stand for width and height of the second bounding box; and $b_{theta}$ stands for an angle of an orientation of the second bounding box with respect to the horizontal axis of the image.

In some embodiments, the computer-readable medium includes a neural network configured to determine the first bounding box. In some embodiments, the neural network includes an output layer configured to output anchor boxes predicting bounding boxes. Optionally, a respective anchor box includes a channel representing a value of an angle of an orientation of the first bounding box with respect to the horizontal axis of the image.

In some embodiments, the neural network uses a loss function expressed as $$L_{total} = L_{obj} + L_{reg} = L_{obj} + L_c + L_{kf}; \quad (16)$$

wherein $L_{total}$ stands for total loss; $L_{obj}$ stands for confidence loss; Le stands for distance loss at the centroid; $L_{reg}=L_c+L_{kf}$; $L_{kf}=1-$KFIoU; and KFIoU is an approximation of skew intersection over union.

In some embodiments, the computer-readable instructions are executable by a processor to cause the processor to further perform obtaining real data of an object to be detected; generating simulation generated training data through a simulation method based on the real data; combining the real data and the simulation generated training data; and training a detection model using a combination of the real data and the simulation generated training data, wherein the detection model is used for determining the first bounding box for an object to be detected in an image.

In some embodiments, the computer-readable instructions are executable by a processor to cause the processor to further perform, in the process of generating the simulation generated training data, extracting object image from the real data; performing foreground segmentation on the object image; obtaining a single foreground image; and pasting multiple single foreground images on a background image, thereby generating the training data.

In some embodiments, the computer-readable instructions are executable by a processor to cause the processor to further perform one or more of randomly pasting a hand image on the foreground image; performing a random rotation on the single foreground image; and performing random scaling on the single foreground image; thereby obtaining a processed single foreground image. These steps may be performed in any appropriate alternative sequences. For example, random scaling may be performed prior to random rotation or prior to randomly pasting a hand image on the foreground image. Pasting a hand image on the foreground image is performed to simulate a scenario of a customer picking up a retail product.

In some embodiments, the computer-readable instructions are executable by a processor to cause the processor to further perform, in the process of generating the simulation generated training data, randomly generating coordinates of a point of pasting a processed single foreground image on the background image; and determining whether ratio values of IoU between the processed single foreground image pasted on the point of pasting and one or more previously pasted foreground images are less than a first threshold IoU value. In one example, the ratio values of IoU may be calculated using, e.g., a left upper corner of the processed single foreground image as the point of pasting. In another example, the computer-readable instructions are executable by a processor to cause the processor to further perform determining whether ratio values of IoU between the processed single foreground image pasted on the point of pasting and all previously pasted foreground images are less than the first threshold IoU value. Exemplary first threshold IoU values include 0.10, 0.15, 0.20, 0.25, 0.30, 0.35, 0.40, 0.45, and 0.50.

In some embodiments, the computer-readable instructions are executable by a processor to cause the processor to further perform, in the process of generating the simulation generated training data, upon determination that the ratio values of IoU between the processed single foreground image pasted on the point of pasting and all previously pasted foreground images are less than the first threshold IoU value, determining whether a ratio value of IoU between the processed single foreground image pasted on the point of pasting and any of the previously pasted foreground images is greater than a second threshold IoU value. Exemplary second threshold IoU values include 0.01, 0.02, 0.03, 0.04, 0.05, 0.06, 0.07, 0.08, 0.09, and 0.10.

In some embodiments, the computer-readable instructions are executable by a processor to cause the processor to further perform, in the process of generating the simulation generated training data, upon determination that the ratio values of IoU between the processed single foreground image pasted on the point of pasting and a respective previously pasted foreground image of the previously pasted foreground images are greater than a second threshold IoU value, subtracting an intersection area from a mask of the respective previously pasted foreground image, the intersection area being an area where the processed foreground image pasted on the point of pasting intersects with the mask; and updating parameters of a respective bounding box of the respective previously pasted foreground image, thereby obtaining updated parameters of an updated bounding box of the previously pasted foreground image. An updated mask of the previously pasted foreground image is generated. Optionally, the computer-readable instructions are executable by a processor to cause the processor to further perform extracting contour points of the updated mask. Based on the contour points extracted from the updated mask, a minimum bounding box (e.g., a minimum outer rectangle) is obtained and converted into a long side format, thereby obtaining the updated parameters of an updated bounding box of the previously pasted foreground image.

In some embodiments, the computer-readable instructions are executable by a processor to cause the processor to further perform, in the process of generating the simulation generated training data, upon determination that none of the ratio values of IoU between the processed single foreground image pasted on the point of pasting and all previously pasted foreground images is less than the first threshold IoU value, determining whether a total number of times of generating coordinates of point of pasting is less than a threshold value. If the total number of times of generating coordinates of a point of pasting is less than the threshold value, and ratio values of IoU between the processed single foreground image pasted on the point of pasting and one or more (e.g., all) previously pasted foreground images are equal to or greater than the first threshold IoU value, the computer-readable instructions are executable by a processor to cause the processor to further perform repeating the step of randomly generating coordinates of a point of pasting the processed single foreground image.

In some embodiments, the computer-readable instructions are executable by a processor to cause the processor to further perform pasting a respective processed single foreground image of all processed single foreground images on a background image in a sparse pasting manner, wherein ratio values of IoU between the respective processed single foreground image and all previously pasted foreground images are less than a third threshold IoU value.

In some embodiments, the computer-readable instructions are executable by a processor to cause the processor to further perform pasting a respective processed single foreground image of all processed single foreground images on a background image in a dense pasting manner, wherein ratio values of IoU between the respective processed single foreground image and all previously pasted foreground images are greater than a fourth threshold IoU value and less than a fifth threshold IoU value.

In some embodiments, the computer-readable instructions are executable by a processor to cause the processor to further perform combining multiple objects as a unit, in which the multiple objects are arranged in a certain format; and pasting a respective unit of all units on a background image in a sparse pasting manner, wherein ratio values of IoU between the respective unit pasted and all previously pasted units are less than a sixth threshold IoU value.

In some embodiments, the computer-readable instructions are executable by a processor to cause the processor to further perform, in the process of comparing the features extracted from the second bounding box with template features of a candidate object, calculating cosine similarity between the features extracted from the second bounding box with the template features of the candidate object; and, upon determination a value of the cosine similarity is greater than a threshold similarity value, outputting the position of the object to be detected and the feature recognition results.

Various illustrative operations described in connection with the configurations disclosed herein may be implemented as electronic hardware, computer software, or combinations of both. Such operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various illustrative neural networks, segments, units, channels, modules, and other operations described in connection with the configurations disclosed herein may be implemented as electronic hardware, computer software, or combinations of both. Such neural networks, segments, units, channels, modules, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented object detection method, comprising:

determining a first bounding box for an object to be detected in an image, wherein an angular difference between an orientation of the first bounding box and an orientation of the object to be detected is 10 degrees or less;

determining whether the first bounding box of the object to be detected in the image is oriented either horizontally or vertically with respect to a horizontal axis of the image;

upon determination that the first bounding box of the object to be detected in the image is not oriented either horizontally or vertically with respect to the horizontal axis of the image, rotating the first bounding box to obtain a second bounding box, which is oriented either horizontally or vertically with respect to the horizontal axis of the image;

extracting features from a portion of the image in the second bounding box;

comparing the features extracted from the portion of the image in the second bounding box with template features of a candidate object; and upon determination the features extracted from the second bounding box are similar to the template features of the candidate object, outputting a position of the object to be detected and feature recognition results;

wherein the first bounding box is represented by a parameter set ($b_x$, $b_y$, $b_w$, $b_h$, $b_{theta}$)

wherein $b_x$ and $b_y$ stand for coordinates of the first bounding box;

$b_w$ and $b_h$ stand for lengths of a long side and a short side of the first bounding box; and $b_{theta}$ stands for an angle of an orientation of the first bounding box with respect to the horizontal axis of the image;

wherein $$b_x = 2\sigma(t_x) - 0.5 + Cx;$$

$$b_y = 2\sigma(t_y) - 0.5 + Cy;$$

$$b_w = p_w(2\sigma(t_w))^2;$$

$$b_h = p_h(2\sigma(t_h))^2;$$

$$b_{theta} = (\sigma(t_{theta}) - 0.5) * \pi;$$

wherein $t_x$, $t_y$, $t_w$, $t_h$, $t_{theta}$ stand for a central coordinate of an anchor box output from a neural network, a box width of the anchor box, a box height of the anchor box, and an angle of an orientation of the anchor box with respect to the horizontal axis of the image;

σ stands for Sigmoid activation function used to map network prediction values;

$t_x$, $t_y$, $t_w$, $t_h$ are between [0,1];

Cx, Cy are offsets in a cell grid relative to a top left corner of the image; $p_w$, $p_h$ are the a priori box width and height;

$b_x$, $b_y$ stand for center coordinates of the second bounding box;

$b_w$, $b_h$ stand for width and height of the second bounding box; and $b_{theta}$ stands for an angle of an orientation of the second bounding box with respect to the horizontal axis of the image.

2. The computer-implemented object detection method of claim 1, wherein determining the first bounding box is performed by a neural network;

wherein the neural network comprises an output layer configured to output anchor boxes predicting bounding boxes; and a respective anchor box includes a channel representing a value of an angle of an orientation of the first bounding box with respect to the horizontal axis of the image.

3. The computer-implemented object detection method of claim 2, wherein the neural network uses a loss function expressed as:

$$L_{total} = L_{obj} + L_{reg} = L_{obj} + L_c + L_{kf}$$

wherein $L_{total}$ stands for total loss;

$L_{obj}$ stands for confidence loss;

$L_c$ stands for distance loss at a centroid;

$$L_{reg} = L_c + L_{kf};$$

$$L_{kf} = 1 - KFIoU; \text{ and}$$

KFIoU is an approximation of skew intersection over union.

4. The computer-implemented object detection method of claim 1, further comprising:

obtaining real data of an object to be detected;

generating simulation generated training data through a simulation method based on the real data;

combining the real data and the simulation generated training data; and training a detection model using a combination of the real data and the simulation generated training data, wherein the detection model is used for determining the first bounding box for an object to be detected in an image.

5. The computer-implemented object detection method of claim 4, wherein generating the simulation generated training data comprises:

extracting object image from the real data;

performing foreground segmentation on the object image;

obtaining a single foreground image; and pasting multiple single foreground images on a background image, thereby generating the training data.

6. The computer-implemented object detection method of claim 5, further comprising one or more of:

randomly pasting a hand image on the single foreground image;

performing a random rotation on the single foreground image;

and performing random scaling on the single foreground image;

thereby obtaining a processed single foreground image.

7. The computer-implemented object detection method of claim 6, wherein generating the simulation generated training data comprises:

randomly generating coordinates of a point of pasting a processed single foreground image on the background image; and determining whether ratio values of intersection over union (IoU) between the processed single foreground image pasted on the point of pasting and one or more previously pasted foreground images are less than a first threshold IoU value.

8. The computer-implemented object detection method of claim 7, wherein generating the simulation generated training data further comprises:

upon determination that the ratio values of IoU between the processed single foreground image pasted on the point of pasting and all previously pasted foreground images are less than the first threshold IoU value, determining whether a ratio value of IoU between the processed single foreground image pasted on the point of pasting and any of the previously pasted foreground images is greater than a second threshold IoU value.

9. The computer-implemented object detection method of claim 8, wherein generating the simulation generated training data further comprises:

upon determination that the ratio values of IoU between the processed single foreground image pasted on the point of pasting and a respective previously pasted foreground image of the previously pasted foreground images are greater than a second threshold IoU value, subtracting an intersection area from a mask of the respective previously pasted foreground image, the intersection area being an area where the processed single foreground image pasted on the point of pasting intersects with the mask; and updating parameters of a respective bounding box of the respective previously pasted foreground image, thereby obtaining updated parameters of an updated bounding box of the respective previously pasted foreground image.

10. The computer-implemented object detection method of claim 7, wherein generating the simulation generated training data further comprises:

upon determination that none of the ratio values of IoU between the processed single foreground image pasted on the point of pasting and all previously pasted foreground images are less than the first threshold IoU value, determining whether a total number of times of generating coordinates of point of pasting is less than a threshold value.

11. The computer-implemented object detection method of claim 10, wherein generating the simulation generated training data further comprises:

upon determination that the total number of times of generating coordinates of point of pasting is less than the threshold value, and none of the ratio values of IoU between the processed single foreground image pasted on the point of pasting and all previously pasted foreground images is less than the first threshold IoU value, repeating the step of randomly generating coordinates of point of pasting the processed single foreground image.

12. The computer-implemented object detection method of claim 4, further comprising:

updating template features of candidate objects with template features of one or more new candidate objects;

wherein the detection model and a recognition model for feature extraction are not re-trained upon addition of the one or more new candidate objects.

13. The computer-implemented object detection method of claim 4, wherein generating the simulation generated training data comprises:

pasting a respective processed single foreground image of all processed single foreground images on a background image in a sparse pasting manner, with a restriction that ratio values of intersection over union (IoU) between the respective processed single foreground image and all previously pasted foreground images are less than a third threshold IoU value.

14. The computer-implemented object detection method of claim 4, wherein generating the simulation generated training data comprises:

pasting a respective processed single foreground image of all processed single foreground images on a background image in a dense pasting manner, with a restriction that ratio values of intersection over union (IoU) between the respective processed single foreground image and all previously pasted foreground images are greater than a fourth threshold IoU value and less than a fifth threshold IoU value.

15. The computer-implemented object detection method of claim 4, wherein generating the simulation generated training data comprises:

combining multiple objects as a unit, in which the multiple objects are arranged in a certain format; and pasting a respective unit of all units on a background image in a sparse pasting manner, with a restriction that ratio values of intersection over union (IoU) between the respective unit pasted and all previously pasted units are less than a sixth threshold IoU value.

16. The computer-implemented object detection method of claim 1, wherein comparing the features extracted from the second bounding box with template features of a candidate object comprises:

calculating cosine similarity between the features extracted from the second bounding box with the template features of the candidate object; and upon determination a value of the cosine similarity is greater than a threshold similarity value, outputting the position of the object to be detected and the feature recognition results.

17. An object detection apparatus, comprising:

a memory;

one or more processors;

wherein the memory and the one or more processors are connected with each other; and the memory stores computer-executable instructions for controlling the one or more processors to:

determine a first bounding box for an object to be detected in an image, wherein an angular difference between an orientation of the first bounding box and an orientation of the object to be detected is 10 degrees or less;

determine whether the first bounding box of the object to be detected in the image is oriented either horizontally or vertically with respect to a horizontal axis of the image;

upon determination that the first bounding box of the object to be detected in the image is not oriented either horizontally or vertically with respect to the horizontal axis of the image, rotate the first bounding box to obtain a second bounding box, which is oriented either horizontally or vertically with respect to the horizontal axis of the image;

extract features from a portion of the image in the second bounding box;

compare the features extracted from the portion of the image in the second bounding box with template features of a candidate object; and upon determination the features extracted from the second bounding box are similar to the template features of the candidate object, output a position of the object to be detected and feature recognition results;

wherein the first bounding box is represented by a parameter set ($b_x$, $b_y$, $b_w$, $b_h$, $b_{theta}$);

wherein $b_x$ and $b_y$ stand for coordinates of the first bounding box:

$b_w$ and $b_h$ stand for lengths of a long side and a short side of the first bounding box; and $b_{theta}$ stands for an angle of an orientation of the first bounding box with respect to the horizontal axis of the image;

wherein $$b_x = 2\sigma(t_x) - 0.5 + Cx;$$
$$b_y = 2\sigma(t_y) - 0.5 + Cy;$$
$$b_w = p_w(2\sigma(t_w))^2;$$
$$b_h = p_h(2\sigma(t_h))^2;$$
$$b_{theta} = (\sigma(t_{theta}) - 0.5) * \pi;$$

wherein $t_x$, $t_y$, $t_w$, $t_h$, $t_{theta}$ stand for a central coordinate of an anchor box output from a neural network, a box width of the anchor box, a box height of the anchor box, and an angle of an orientation of the anchor box with respect to the horizontal axis of the image;

σ stands for Sigmoid activation function used to map network prediction values;

$t_x$, $t_y$, $t_w$, $t_h$ are between [0,1];

Cx, Cy are offsets in a cell grid relative to a top left corner of the image; $p_w$, $p_h$ are the a priori box width and height;

$b_x$, $b_y$ stand for center coordinates of the second bounding box;

$b_w$, $b_h$ stand for width and height of the second bounding box; and $b_{theta}$ stands for an angle of an orientation of the second bounding box with respect to the horizontal axis of the image.

18. A computer-program product, comprising a non-transitory tangible computer-readable medium having computer-readable instructions thereon, the computer-readable instructions being executable by a processor to cause the processor to perform:

determining a first bounding box for an object to be detected in an image, wherein an angular difference between an orientation of the first bounding box and an orientation of the object to be detected is 10 degrees or less;

determining whether the first bounding box of the object to be detected in the image is oriented either horizontally or vertically with respect to a horizontal axis of the image;

upon determination that the first bounding box of the object to be detected in the image is not oriented either horizontally or vertically with respect to the horizontal axis of the image, rotating the first bounding box to obtain a second bounding box, which is oriented either horizontally or vertically with respect to the horizontal axis of the image;

extracting features from a portion of the image in the second bounding box;

comparing the features extracted from the portion of the image in the second bounding box with template features of a candidate object; and upon determination the features extracted from the second bounding box are similar to the template features of the candidate object, outputting a position of the object to be detected and feature recognition results;

wherein the first bounding box is represented by a parameter set ($b_x$, $b_y$, $b_w$, $b_h$, $b_{theta}$);

wherein $b_x$ and $b_y$ stand for coordinates of the first bounding box;

$b_w$ and $b_h$ stand for lengths of a long side and a short side of the first bounding box; and $b_{theta}$ stands for an angle of an orientation of the first bounding box with respect to the horizontal axis of the image;

wherein $$b_x = 2\sigma(t_x) - 0.5 + Cx;$$
$$b_y = 2\sigma(t_y) - 0.5 + Cy;$$
$$b_w = p_w(2\sigma(t_w))^2;$$
$$b_h = p_h(2\sigma(t_h))^2;$$
$$b_{theta} = (\sigma(t_{theta}) - 0.5) * \pi;$$

wherein $t_x$, $t_y$, $t_w$, $t_h$, $t_{theta}$ stand for a central coordinate of an anchor box output from a neural network, a box width of the anchor box, a box height of the anchor box, and an angle of an orientation of the anchor box with respect to the horizontal axis of the image;

σ stands for Sigmoid activation function used to map network prediction values;

$t_x$, $t_y$, $t_w$, $t_h$ are between [0,1];

Cx, Cy are offsets in a cell grid relative to a top left corner of the image; $p_w$, $p_h$ are the a priori box width and height;

$b_x$, $b_y$ stand for center coordinates of the second bounding box:

$b_w$, $b_h$ stand for width and height of the second bounding box; and $b_{theta}$ stands for an angle of an orientation of the second bounding box with respect to the horizontal axis of the image.

* * * * *